US010893439B2

(12) United States Patent
Abedini et al.

(10) Patent No.: US 10,893,439 B2
(45) Date of Patent: Jan. 12, 2021

(54) RESOURCE PARTITIONING IN A WIRELESS BACKHAUL NETWORK

(71) Applicant: QUALCOMM Incorporated, San Diego, CA (US)

(72) Inventors: Navid Abedini, Raritan, NJ (US); Karl Georg Hampel, Hoboken, NJ (US); Junyi Li, Chester, NJ (US); Sundar Subramanian, San Diego, CA (US); Muhammad Nazmul Islam, Edison, NJ (US); Juergen Cezanne, Ocean Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/988,844

(22) Filed: May 24, 2018

(65) Prior Publication Data
US 2019/0014500 A1    Jan. 10, 2019

Related U.S. Application Data

(60) Provisional application No. 62/530,623, filed on Jul. 10, 2017.

(51) Int. Cl.
*H04W 28/06* (2009.01)
*H04W 28/08* (2009.01)
(Continued)

(52) U.S. Cl.
CPC ........ *H04W 28/085* (2013.01); *H04B 7/0617* (2013.01); *H04B 7/0626* (2013.01);
(Continued)

(58) Field of Classification Search
CPC .............. H04W 28/085; H04W 16/00; H04W 72/0453; H04W 72/0486; H04W 74/0833;
(Continued)

(56) References Cited

U.S. PATENT DOCUMENTS

2013/0034043 A1* 2/2013 Yu ................. H04W 72/085
                                                    370/315
2015/0350945 A1* 12/2015 Chae ............... H04J 11/0056
                                                    370/252
(Continued)

FOREIGN PATENT DOCUMENTS

EP    3190818 A1 *  7/2017  ............ H04W 16/10
GB    2539731 A    12/2016
(Continued)

OTHER PUBLICATIONS

QUALCOMM Incorporated: "SMARTER: Wireless Self-Backhauling", 3GPP Draft; S1-154131 Smarter Neo Wireless Backhaul, F-06921 Sophia-Antipolis Cedex;France, vol. SA WG1, No. Anaheim, California; Nov. 16, 2015-Nov. 20, 2015, Nov. 10, 2015 (Year: 2015).*

(Continued)

*Primary Examiner* — Hardikkumar D Patel
(74) *Attorney, Agent, or Firm* — Holland & Hart LLP

(57) ABSTRACT

Methods, systems, and devices for wireless communication are described. A wireless node may establish a wireless connection between the wireless node and a second wireless node in a wireless backhaul communications network. The wireless node may identify a first set of common resources for use in at least one of access communications or backhaul communications. The first set of common resources is allocated for common use by the wireless nodes of the wireless backhaul communications network. The wireless node may identify a second set of partitioned resources available for at least one of access communications or backhaul communications. The second set partitioned into a plurality of subsets each allocated for use by selected subsets of one or more of the wireless nodes of the wireless backhaul communications network.

40 Claims, 13 Drawing Sheets

(51) Int. Cl.
*H04L 27/26* (2006.01)
*H04B 7/06* (2006.01)
*H04W 16/00* (2009.01)
*H04L 5/00* (2006.01)
*H04W 72/04* (2009.01)
*H04W 74/08* (2009.01)

(52) U.S. Cl.
CPC .......... *H04L 5/0007* (2013.01); *H04L 5/0035* (2013.01); *H04L 27/261* (2013.01); *H04W 16/00* (2013.01); *H04L 5/0053* (2013.01); *H04W 72/0453* (2013.01); *H04W 72/0486* (2013.01); *H04W 74/0833* (2013.01)

(58) Field of Classification Search
CPC ......... H04W 72/0406; H04W 72/0446; H04W 28/00; H04W 72/085; H04W 16/28; H04W 24/10; H04W 8/00; H04W 48/14; H04W 72/04; H04W 48/16; H04W 56/00; H04W 24/08; H04W 4/02; H04W 76/02; H04W 56/0015; H04W 4/023; H04W 76/14; H04W 56/002; H04W 56/0045; H04W 72/08; H04W 52/02; H04W 72/12; H04W 72/082; H04W 52/0206; H04W 74/02; H04B 7/0617; H04B 7/0626; H04B 17/00; H04B 17/24; H04B 17/345; H04L 27/261; H04L 5/0053; H04L 5/0057; H04L 5/0073; H04L 27/2602; H04L 25/0204; H04L 25/0224; H04L 27/26; H04L 5/00; H04J 11/0056; H04J 11/00; H04J 11/0026
See application file for complete search history.

(56) References Cited

U.S. PATENT DOCUMENTS

| | | | | |
|---|---|---|---|---|
| 2015/0365814 A1* | 12/2015 | El Ayach | ............ | H04W 48/16 370/254 |
| 2017/0034800 A1* | 2/2017 | Abedini | ............ | H04W 56/0015 |
| 2017/0196015 A1* | 7/2017 | Lu | ............ | H04W 72/082 |
| 2017/0294976 A1* | 10/2017 | Hahn | ............ | H04W 16/28 |
| 2017/0359827 A1 | 12/2017 | Kim et al. | | |

FOREIGN PATENT DOCUMENTS

| | | |
|---|---|---|
| WO | WO-2015154599 A1 | 10/2015 |
| WO | WO-2016089044 A1 | 6/2016 |
| WO | WO-2016148838 A1 | 9/2016 |

OTHER PUBLICATIONS

International Search Report and Written Opinion—PCT/US2018/034589—ISA/EPO—dated Aug. 13, 2018.
QUALCOMM Incorporated: "SMARTER: Wireless Self-Backhauling", 3GPP Draft; S1-154131 Smarter Neo Wireless Backhaul, 3rd Generation Partnership Project (3GPP), Mobile Competence Centre; 650, Route Des Lucioles; F-06921 Sophia-Antipolis Cedex; France, vol. SA WG1, No. Anaheim, California; Nov. 16, 2015-Nov. 20, 2015, Nov. 10, 2015, XP051043012, Retrieved from the Internet: URL:http://www.3gpp.org/ftp/tsg_sa/WG1_Serv/TSGS1_72_Anaheim/docs/ [retrieved-on Nov. 10, 2015], 2 pages.

* cited by examiner

RESOURCE PARTITIONING IN A WIRELESS BACKHAUL NETWORK

CROSS REFERENCES

The present Application for Patent claims the benefit of U.S. Provisional Patent Application No. 62/530,623 by ABEDINI, et al., entitled "RESOURCE PARTITIONING IN A WIRELESS BACKHAUL NETWORK," filed Jul. 10, 2017, assigned to the assignee hereof, and expressly incorporated herein.

BACKGROUND

The following relates generally to wireless communication, and more specifically to resource partitioning in a wireless backhaul network.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Wireless communication systems may rely on backhaul networks to exchange information between nodes (e.g., between base stations and/or between a base station and a core network). Some backhaul networks may be wired, may be wireless, or may include a mix of wired and wireless links. The backhaul networks may be used to communicate user plane traffic and/or control plane traffic. A wireless backhaul network may include some or all of the wireless nodes (e.g., base stations and/or UEs) being configured with an access node function (ANF) and/or a UE function (UEF) that controls, monitors, or otherwise manages aspect(s) of the wireless backhaul network. Such wireless backhaul networks may include different sets of resources (e.g., any one or combination of time, frequency, space, code, etc., resources) being allocated to different nodes. For example, a first subset of the set of resources may be allocated to a first subset of nodes of the wireless backhaul network and a second subset of resources may be allocated to a second subset of nodes. Partitioning the resources in such a manner may minimize interference, but may be costly with respect to such resources and/or may minimize which nodes are able to communicate with each other. This may delay traffic between such nodes.

SUMMARY

The described techniques relate to improved methods, systems, devices, or apparatuses that support resource partitioning in a wireless backhaul network. Generally, the described techniques provide for allocating a set of resources for common use among the nodes of a wireless backhaul network. For example, the set of common resources may be used for backhaul communications, access network communications, and the like. Examples of communications that may use the set of common resources may include, but are not limited to, synchronization signals/ channels, random access channel (RACH) messages (e.g., RACH message 1, message 2, message 3, and/or message 4), system information messages (e.g., master information block (MIB), system information block (SIB), minimum system information (minSI), and the like), and/or reference signal transmissions. The set of common resources may be different from the partitioned resources used by the subsets of nodes of the wireless backhaul network. The set of common resources may be dynamically determined (e.g., by node(s) of the wireless backhaul network) and/or may be determined by a central scheduler function (e.g., the core network), and/or may be preconfigured or otherwise known a priori by the nodes.

A method of wireless communication is described. The method may include establishing a wireless connection between a first wireless node and a second wireless node in a wireless backhaul communications network, identifying a first set of common resources for use in at least one of access communications or backhaul communications, wherein the first set of common resources is allocated for common use by the wireless nodes of the wireless backhaul communications network, and identifying a second set of partitioned resources available for at least one of access communications or backhaul communications, the second set partitioned into a plurality of subsets each allocated for use by selected subsets of one or more of the wireless nodes of the wireless backhaul communications network.

An apparatus for wireless communication is described. The apparatus may include means for establishing a wireless connection between a first wireless node and a second wireless node in a wireless backhaul communications network, means for identifying a first set of common resources for use in at least one of access communications or backhaul communications, wherein the first set of common resources is allocated for common use by the wireless nodes of the wireless backhaul communications network, and means for identifying a second set of partitioned resources available for at least one of access communications or backhaul communications, the second set partitioned into a plurality of subsets each allocated for use by selected subsets of one or more of the wireless nodes of the wireless backhaul communications network.

Another apparatus for wireless communication is described. The apparatus may include a processor, memory in electronic communication with the processor, and instructions stored in the memory. The instructions may be operable to cause the processor to establish a wireless connection between a first wireless node and a second wireless node in a wireless backhaul communications network, identify a first set of common resources for use in at least one of access communications or backhaul communications, wherein the first set of common resources is allocated for common use by the wireless nodes of the wireless backhaul communications network, and identify a second set of partitioned resources available for at least one of access communications or backhaul communications, the second set partitioned into a plurality of subsets each allocated for use by selected subsets of one or more of the wireless nodes of the wireless backhaul communications network.

A non-transitory computer readable medium for wireless communication is described. The non-transitory computer-readable medium may include instructions operable to cause a processor to establish a wireless connection between a first wireless node and a second wireless node in a wireless backhaul communications network, identify a first set of common resources for use in at least one of access communications or backhaul communications, wherein the first set of common resources is allocated for common use by the wireless nodes of the wireless backhaul communications network, and identify a second set of partitioned resources available for at least one of access communications or backhaul communications, the second set partitioned into a plurality of subsets each allocated for use by selected subsets of one or more of the wireless nodes of the wireless backhaul communications network.

Some examples of the method, apparatus, and non-transitory computer-readable medium described above may further include processes, features, means, or instructions for communicating with the second wireless node using the first set of common resources or the second set of partitioned resources.

Some examples of the method, apparatus, and non-transitory computer-readable medium described above may further include processes, features, means, or instructions for receiving a message, wherein identifying the first set of common resources may be based at least in part on the received message.

In some examples of the method, apparatus, and non-transitory computer-readable medium described above, the message may be received from a central scheduler function of a core network.

In some examples of the method, apparatus, and non-transitory computer-readable medium described above, the message may be received from a neighboring wireless node of the wireless backhaul communications network.

In some examples of the method, apparatus, and non-transitory computer-readable medium described above, the message identifying the first set of common resources comprises a minSI message, a MIB message, a SIB message, an upper layer message, a synchronization signal, a reference signal, a radio resource control (RRC) message, or any combination thereof.

Some examples of the method, apparatus, and non-transitory computer-readable medium described above may further include processes, features, means, or instructions for transmitting a message to a neighboring wireless node identifying at least a portion of the first set of common resources.

Some examples of the method, apparatus, and non-transitory computer-readable medium described above may further include processes, features, means, or instructions for receiving a message, wherein identifying the subset of resources of the second set of partitioned resources may be based at least in part on the received message.

In some examples of the method, apparatus, and non-transitory computer-readable medium described above, the message may be received from a central scheduler function of a core network.

In some examples of the method, apparatus, and non-transitory computer-readable medium described above, the message may be received from a neighboring wireless node of the wireless backhaul communications network.

In some examples of the method, apparatus, and non-transitory computer-readable medium described above, the message identifying the subset of resources of the second set of partitioned resources comprises a minSI message, a MIB message, a SIB message, an upper layer message, a synchronization signal, a reference signal, a RRC message, or any combination thereof.

Some examples of the method, apparatus, and non-transitory computer-readable medium described above may further include processes, features, means, or instructions for transmitting a message to a neighboring wireless node identifying at least a portion of the subset of resources of the second set of partitioned resources.

Some examples of the method, apparatus, and non-transitory computer-readable medium described above may further include processes, features, means, or instructions for identifying the first set of common resources and the subset of resources of the second set of partitioned resources based at least in part on using information stored by the first wireless node.

Some examples of the method, apparatus, and non-transitory computer-readable medium described above may further include processes, features, means, or instructions for performing an access procedure with at least one other wireless node of the wireless backhaul communications network using the first set of common resources.

In some examples of the method, apparatus, and non-transitory computer-readable medium described above, the access procedure comprises at least one of: a synchronization procedure, a random access procedure, a system information procedure, a reference signal procedure, a paging procedure, a discovery messaging procedure, a radio resource management procedure, a radio link management procedure, or any combination thereof. In some examples of the method, apparatus, and non-transitory computer-readable medium described above, the paging procedure comprises communicating on at least one of a control channel and/or a data channel.

In some examples of the method, apparatus, and non-transitory computer-readable medium described above, the synchronization procedure comprises communicating synchronization signals or on a synchronization channel using at least a portion of the first set of common resources for access communications, backhaul communications, or combinations thereof.

In some examples of the method, apparatus, and non-transitory computer-readable medium described above, the random access procedure comprises communicating at least one of a RACH message 1, a RACH message 2, a RACH message 3, or a RACH message 4 using at least a portion of the first set of common resources for access communications, backhaul communications, or combinations thereof.

In some examples of the method, apparatus, and non-transitory computer-readable medium described above, the system information procedure comprises communicating at least one of a MIB, a SIB, a minSI, and/or a remaining minimum system information (RMSI), using at least a portion of the first set of common resources for access communications, backhaul communications, or combinations thereof.

In some examples of the method, apparatus, and non-transitory computer-readable medium described above, the reference signal procedure comprises communicating at least one of a channel state information reference signal (CSI-RS), or a positioning reference signal (PRS), or a beamform reference signal (BRS) using at least a portion of the first set of common resources for access communications, backhaul communications, or combinations thereof.

In some examples of the method, apparatus, and non-transitory computer-readable medium described above, the wireless backhaul communications network comprises a millimeter wave (mmW) wireless communication network.

Some examples of the method, apparatus, and non-transitory computer-readable medium described above may further include processes, features, means, or instructions for either the first set of common resources or the second set of partitioned resources comprise a time division multiplexing resource, a frequency division multiplexing resource, a code division multiplexing resource, a space division multiplexing resource, or any combination thereof.

DETAILED DESCRIPTION

In some wireless communications systems, an access node may typically enjoy a robust wireline link to a network entity that coordinates aspects of backhaul communications (e.g., the network entity provides timing information, cell identity, etc.) for neighboring access nodes to coordinate backhaul transmissions. Access nodes operating in millimeter wave (mmW) frequency ranges may be associated with a reduced coverage area (e.g., a smaller geographic footprint, directional transmissions, etc.), which may result in a deployment of a larger number of access nodes to provide acceptable coverage areas to users. As a result, a number of access nodes within the wireless communication system may not be coupled with a wireline backhaul link and may instead use wireless backhaul links for backhaul communications. However, such a dense deployment of mmW access nodes may be affected by inefficient resource allocation in the absence of techniques that provide coherent wireless resource allocation and scheduling.

Aspects of the disclosure are initially described in the context of a wireless communications system. Generally, aspects of the described techniques provide for allocating a set of resources that are common to, and can be used by, all nodes in a wireless backhaul network. For example, wireless nodes may be connected in a backhaul wireless network. One set of resources may be partitioned into subsets of resources and are allocated to a subset of the nodes of the wireless backhaul network. For example, a first subset of the partitioned resources may be allocated to a first subset of nodes and a second subset of the partitioned resources may be allocated to a second subset of the nodes. The common resources may be allocated to all of the nodes in the wireless backhaul network and may be used for access and/or backhaul communications. In some aspects, the common resources may be used for communicating synchronization, random access channel (RACH), system information, and/or reference signal information between the nodes of the wireless backhaul network. The nodes may therefore use their respective allocated subset of partitioned resources for access/backhaul traffic (e.g., uplink and/or downlink traffic) and use the common resources for access and/or backhaul traffic (e.g., access procedures in the backhaul and/or access network).

Aspects of the disclosure are further illustrated by and described with reference to apparatus diagrams, system diagrams, and flowcharts that relate to resource partitioning in a wireless backhaul network.

Figure 1:
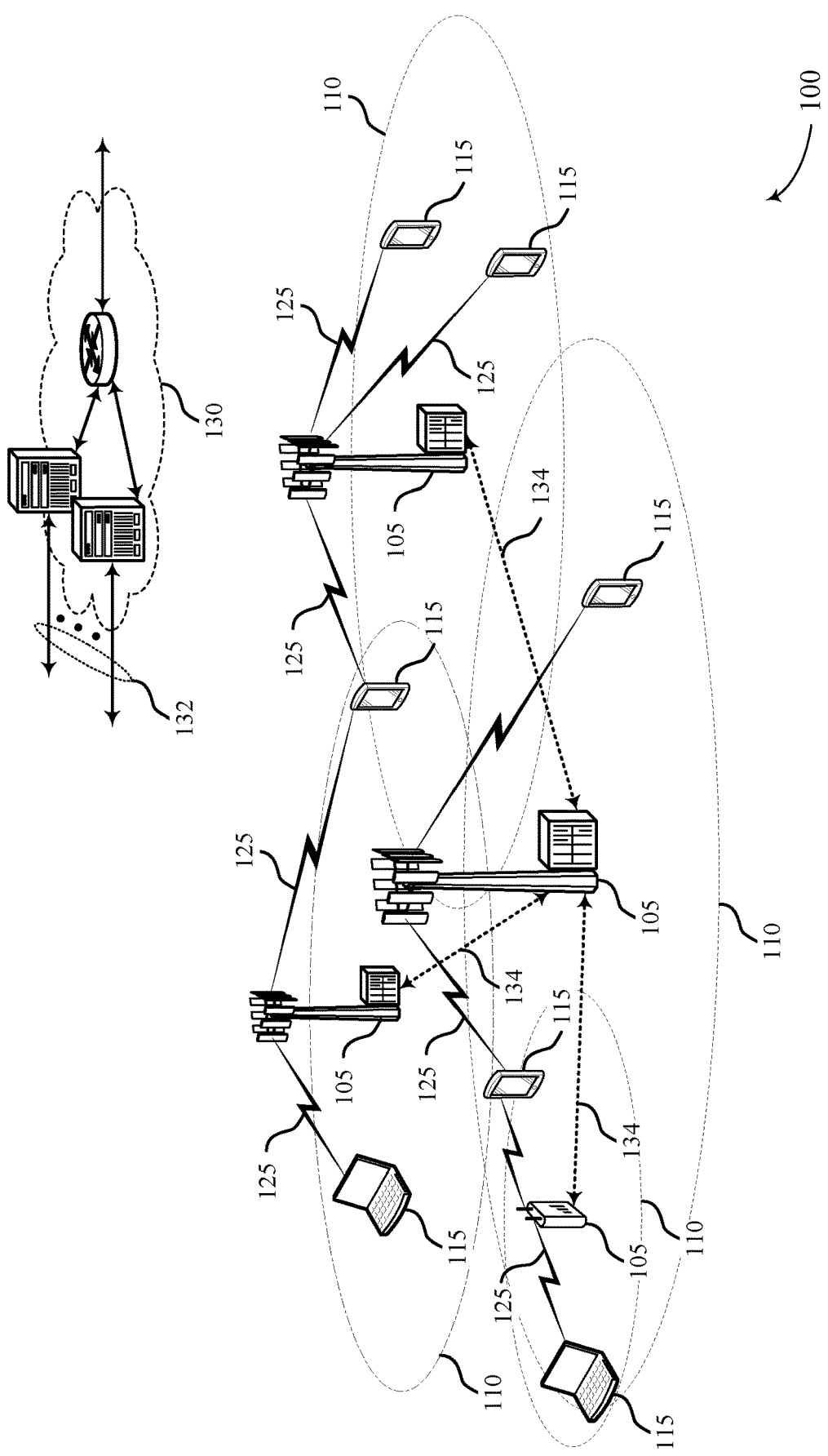
FIG. 1 illustrates an example of a system for wireless communication that supports resource partitioning in a wireless backhaul network in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink channel according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support mmW communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a base station 105, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s$=1/30,720,000 seconds). Time resources may be organized according to radio frames of length of 10 ms ($T_f$=307200$T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

In some cases, cellular radio access technologies (RATs), such as mmW-based RATs, may be used to support access traffic between UEs 115 and base stations 105, in addition to backhaul and access traffic among multiple base stations 105. Moreover, both access and backhaul traffic may share the same resources (e.g., as in the case of integrated access and backhaul (IAB)). Such wireless backhaul or IAB solutions may be increasingly beneficial with the evolution of cellular technologies due to enhancements in wireless link capacity and reduction in latency. Further, the use of wireless backhaul links may reduce the cost of dense small cell deployments.

Thus, using a RAT may enable wireless backhaul communication using one or more node functions at a wireless node, such as a base station 105, access node, or UE 115. Additionally, multiple wireless nodes may communicate in a backhaul network using a schedule that is aligned with a frame structure. For example, a wireless node (e.g., UE 115 and/or base station 105) may establish a link with different wireless nodes (e.g., UE 115 and/or base station 105) using a RAT that supports a synchronized frame structure, such as a mmW RAT. The wireless node may identify a first set of common resources for use in access and/or backhaul communications. The common resource may be allocated for common use by all of the wireless nodes of the wireless backhaul network. The wireless node may identify second set of partitioned resources available for use in access and/or backhaul communications. The second set of partitioned resources may be partitioned into subsets of resources, each subset allocated for use by a selected subset of wireless nodes of the wireless backhaul network.

Figure 2:
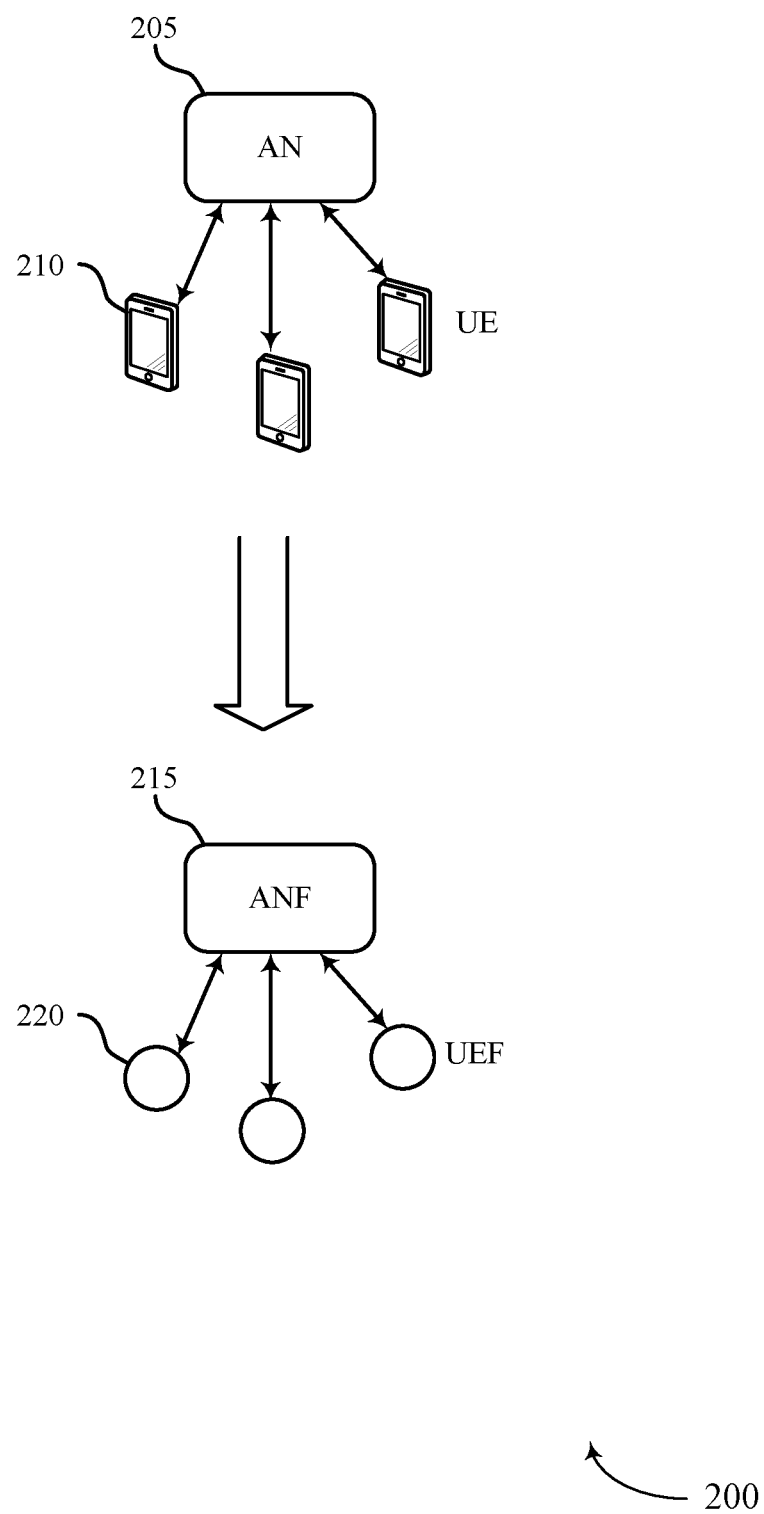
FIG. 2 illustrates an example of a backhaul network that supports resource partitioning in a wireless backhaul network in accordance with aspects of the present disclosure.

FIG. 2 illustrates an example of a backhaul network 200 that supports resource partitioning in a wireless backhaul network in accordance with various aspects of the present disclosure. In some examples, backhaul network 200 may implement aspects of wireless communications system 100. Backhaul network 200 may include an access node 205, a plurality of UEs 210, an access node function (ANF) 215, and a plurality of UE functions (UEF) 220, which may be examples of the corresponding devices described herein. That is, AN 205, UE 210, ANF 215, and/or UEF 220 may be examples of a UE 115 and/or base station 105, as described herein.

In backhaul network 200, a number of access nodes 205 (one being shown for clarity) may be interconnected via communication links (e.g., backhaul links) and thus form a given topology with respect to access nodes 205, as described below. In such cases, the access node 205 may instantiate one or more node functions to coordinate signaling and resource allocation. For example, the access nodes 205 may instantiate one or more ANFs 215, one or more UEFs 220, or any combination thereof.

Access node 205 may be located at a central point of a star, and may be connected to a wireline backhaul link (e.g., an optical fiber cable) to a core network. In some cases, access node 205 may be the only access node in backhaul network 200 that is connected to the wireline backhaul link. Access node 205 may instantiate an ANF 215, and the nodes at the leaves of the star (e.g., UEs 210) may each instantiate a UEF 220. Access node 205 may then communicate with UEs 210 using communication link(s) using the node functions. In some cases, communication link may be associated with a first set of wireless resources that are common to all nodes of the backhaul network 200. In some cases, communication links may be associated with a second set of resources that are partitioned into subsets of partitioned resources. The subsets of partitioned resources may be allocated to subsets of the nodes of the backhaul network 200.

The ANFs 215 and the UEFs 220 may be assigned the same functionalities and signaling protocols for resource allocation as defined by a RAT. That is, resource coordination of a backhaul star can be managed via the RAT, such as a mmW RAT. Furthermore, wireless resource use among access nodes 205 within a star may be coordinated via a large-scale (e.g., network-wide) schedule. Within each star, signaling and resource management may be regulated by the RAT and a resource sub-schedule may be generated by a star's ANF (such as the ANF 215 instantiated at access node 205).

In some examples, access node 205 and/or UE 210 may instantiate an ANF 215 in addition to the UEF 220. Access node 205 may accordingly communicate with neighboring access node(s) using communication links according to the node functions.

In some cases, ANFs 215 may support transmission of a downlink control channel, reception of an uplink control channel, scheduling of downlink and uplink data transmission within a resource space assigned to a link or to a set of links, transmission of synchronization signals and cell reference signals (e.g., as a primary synchronization symbol (PSS) or secondary synchronization symbol (SSS) on a synchronization channel), transmitting beam sweeps, and transmitting downlink beam change requests. Additionally, UEFs 220 may support reception of a downlink control channel, transmission of a uplink control channel, requesting scheduling of uplink data transmissions, transmission of random access preambles on a random access channel, listening to beam sweeps and reporting beam indexes and beam signal strength detected, and executing downlink beam change requests. In some cases, there may be other features that differentiate the ANF 215 and the UEF 220 implemented at a node. As described above, an access node 205 may implement a combination of one or more node functions, such as multiple ANFs 215, multiple UEFs 220, or combinations thereof.

Figure 3:
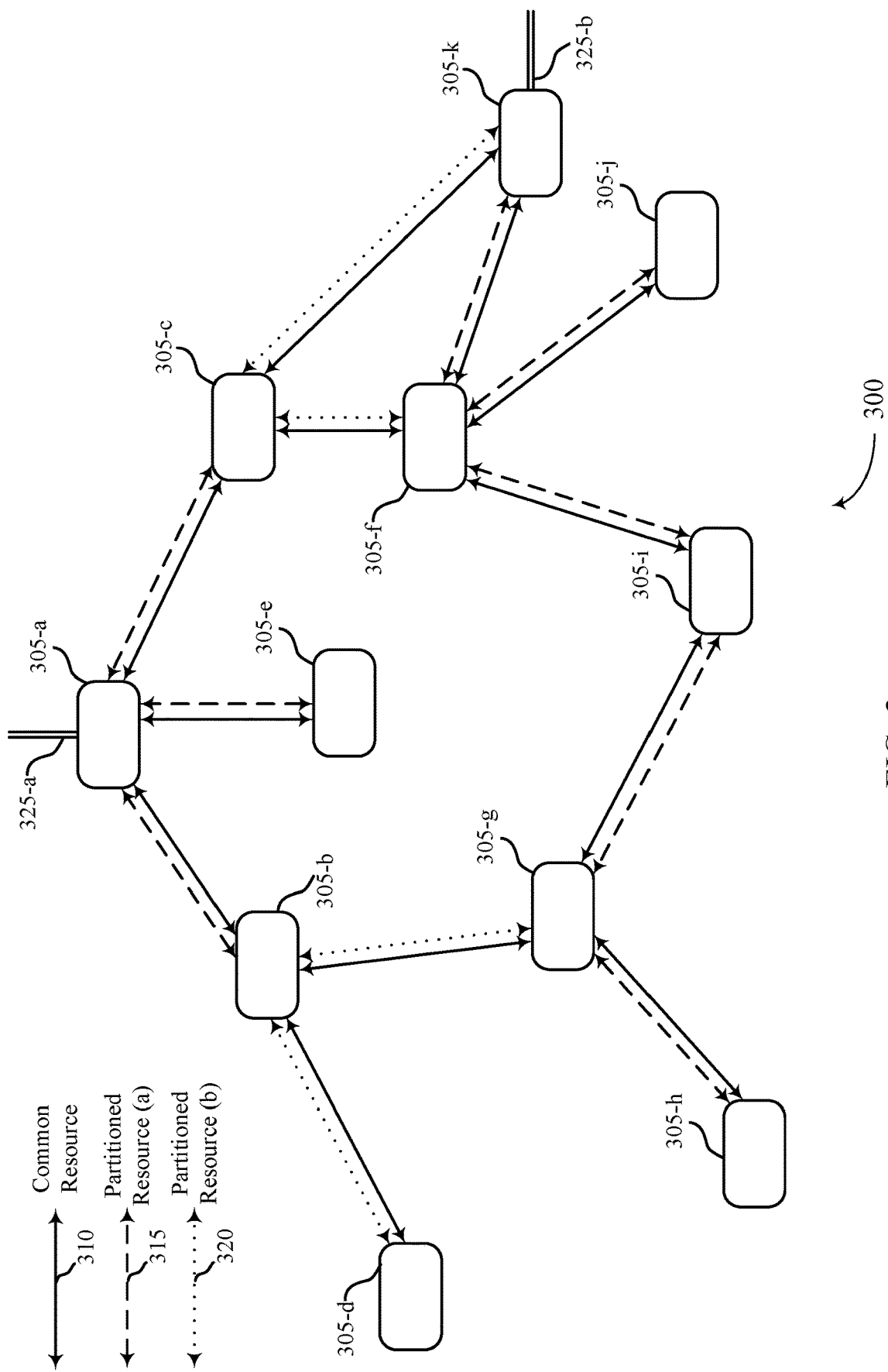
FIG. 3 illustrates an example of a backhaul network that supports resource partitioning in a wireless backhaul network in accordance with aspects of the present disclosure.

FIG. 3 illustrates an example of a backhaul network 300 that supports resource partitioning in a wireless backhaul network in accordance with various aspects of the present disclosure. In some examples, backhaul network 300 may implement aspects of wireless communications system 100 and/or backhaul network 200. Backhaul network 300 may include a plurality of wireless nodes 305, which may be examples of a UE 115 and/or a base station 105 described herein. In some aspects, the features described with reference to wireless nodes 305 may be performed by an ANF and/or UEF configured on the wireless node 305.

In some examples, complex backhaul topologies may be handled by composing the topology from multiple stars that mutually overlap. For instance, backhaul network 300 may comprise a mesh topology with two interfaces to a wireline network (e.g., wireless nodes 305-*a* and 305-*k* coupled with wireline backhaul links 325-*a* and 325-*b*, respectively). In some aspects, the wireline backhaul links 325 may be fiber interfaces connecting the wireless nodes 305 to a core network. Such a topology may comprise multiple stars, where some stars mutually overlap. One or more ANF(s) may be allocated to an access node 305 at the center of each star (e.g., wireless nodes 305-*a*, 305-*b*, 305-*c*, etc.), while a UEF may be allocated to the wireless node 305 at each of the leaves. As a result, any wireless node 305 may include multiple ANFs and UEFs.

Certain wireless node(s) 305 may include multiple instances of a UEF, where the UEF may communicate with the ANFs at other wireless node 305 (e.g., wireless node 305-*i* may include two UEFs where one manages communications with wireless node 305-*g* and the other manages communications with wireless node 305-*f*). Additionally, certain wireless nodes 305 may each communicate with each other using at least one ANF and at least one UEF, and may form overlapping stars. In some cases, the communication links may be associated with different sets of resources, where the resources are cooperatively allocated according to a schedule established by the ANFs (e.g., preconfigured, dynamically determined, and the like) and/or may be signaled from a core network. Multiple stars may use techniques to coordinate wireless resources, which may efficiently handle system constraints.

For example, wireless nodes 305 may establish wireless connections with adjacent wireless nodes 305 to form a backhaul communication network. The wireless nodes 305 may identify different resources to use for communicating with each other. A first set of resource may be common resources 310 that are used for access and/or backhaul communication. The first set of common resources 310 may be common in that they are allocated for use by any wireless node 305 of the backhaul network 300. As illustrated in backhaul network 300, the common resources 310 are illustrated by a solid line and may be used for access and/or backhaul communications between any of the wireless nodes 305.

A second set of resources may also be identified and may be used for access and/or backhaul communications. The second set of partitioned resources may be partitioned into subsets of resources (illustrated as partitioned resources (a) and partitioned resources (b)). The second set of partitioned resources may be allocated such that a first subset of resources 315 (illustrated by a dashed line) may be allocated for use by a subset of wireless nodes 305 and a second subset of resources 320 (illustrated by a dotted line) may be allocated for use by a different subset of wireless nodes 305. In some aspects, the second set of resources may be partitioned into subsets such that neighboring wireless nodes use different subsets of partitioned resources for interference avoidance. For example, wireless node 305-a may use a first subset of resources 315 for access and/or backhaul communications with wireless nodes 305-b, 305-c, and 305-e. Wireless node 305-b, however, may use the second subset of resources 320 for communications with wireless nodes 305-d and 305-g. Wireless node 305-g may then again use the first subset of resources 315 for access and/or backhaul communications with wireless nodes 305-h and 305-i. Partitioning the second set of resources into a plurality of subsets of resources and then allocating them for use by different subsets of wireless nodes 305 may avoid interference between the wireless nodes, e.g., avoid interfering communications between wireless nodes 305-a and 305-b and wireless nodes 305-b and 305-g.

That is, certain available resources are partitioned and allocated to different wireless nodes 305 in the backhaul network 300 (e.g., IAB) such that a wireless node 305 can be in communication only within the specifically allocated resources, there may be a set of resources that may be commonly used by all the wireless nodes 305 in the backhaul network 300. As one example, to support access procedures (in the backhaul and/or access network), a first set of common resources can be allocated to any of synchronization, RACH, beam or channel reference signal, MIB/minSI, or other system information transmissions. Using these common resources, all the wireless nodes 305 (irrespective of the their allocated subset of partitioned resources for traffic—e.g. the allocated subset of partitioned resources) may participate in an access procedure.

In some aspects, a resource configuration scheme in a wireless (backhaul, or TAB) network may include two sets of resources. The first set of resources may be commonly used by a plurality of wireless nodes 305 and the second set of resources may be partitioned into a plurality of subsets of resources, wherein each wireless node 305 may be allocated one or multiple of these subsets (for backhaul and/or access communication). A subset of resources may also be allocated to multiple wireless nodes. In some aspects, the first set of resources may be used for an access procedure, for any combination of the following: transmit (Tx) and/or receive (Rx) synchronization signals or channels (for backhaul and/or access); Tx/Rx random access signals (for backhaul and/or access), including RACH preamble (message 1), and/or RAR (e.g., RACH message 2), or other messages (message 3 or 4); Tx/Rx system information (for backhaul and/or access), including MIB, minSI, RMSI, other system information; Tx/Rx reference signals used for beam measurement (for backhaul and/or access), for example CSI-RS, positioning reference signal (PRS), BRS, etc. As discussed, the backhaul network 300 may operate, at least partially, in a mmW band.

In some aspects, the resource configuration scheme may be determined in any combination of: centralized (e.g., by a central scheduler, which may be an entity in the core network, or one of the wireless nodes 305); distributed (e.g., locally and through coordination and signal exchange among different wireless nodes 305), and the like. In some aspects, a portion of the resource configuration scheme may be preconfigured, e.g., a subset of resources may be deterministically allocated to the first set of common resources (e.g., some fixed time slots may be allocated for backhaul synchronization). In some aspects, a wireless node 305 (e.g., the ANF configured on the wireless node 305) may locally schedule resources, within the allocated subsets of resources of the second set of partitioned resources, among one or multiple backhaul and/or access links. In some aspects, the resource configuration of the first set of common resources may be at least partially indicated in any one or combination of minSI, MIB, sync signals, other system information. A new wireless node 305 may acquire this information before establishing a connection with any other wireless nodes 305 in the backhaul network 300.

In some aspects, the resource configuration of the second set of partitioned resources may be at least partially indicated thru RRC messaging after a connection is established between two wireless nodes 305.

In some aspects, references to resource may include time resources, frequency resources, code resources (e.g., scrambling codes), and space resources (e.g., directions of beamformed transmissions) either alone or in any combination. Accordingly, the allocated first and second set of resources may implement FDM, TDM, CDM, space division multiplexing (SDM) techniques, alone or in any combination.

In some aspects, a wireless node 305 may autonomously repurpose some or all of the common resources. For example, a wireless node 305 may identify a subset of the first set of common resources to be repurposed for local communications. The wireless node 305 may transmit a signal to other wireless nodes that identifies the subset of the first set of common resources.

In some aspects, a wireless node 305 may request for some or all of the common resources to be repurposed. For example, a wireless node 305 may identify a subset of the first set of common resources to be repurposed for local communications. The wireless node 305 may transmit a signal (e.g., a first signal) to other wireless nodes that indicates a request for the subset of the first set of common resources to be repurposed for use in local communications. The wireless node 305 may receive a signal (e.g., a second signal) from at least one of the other wireless nodes indicating a repurpose approval for the subset of the first set of common resources. Accordingly, the wireless node 305 may use the subset of the first set of common resources based on the repurpose approval.

Figure 4:
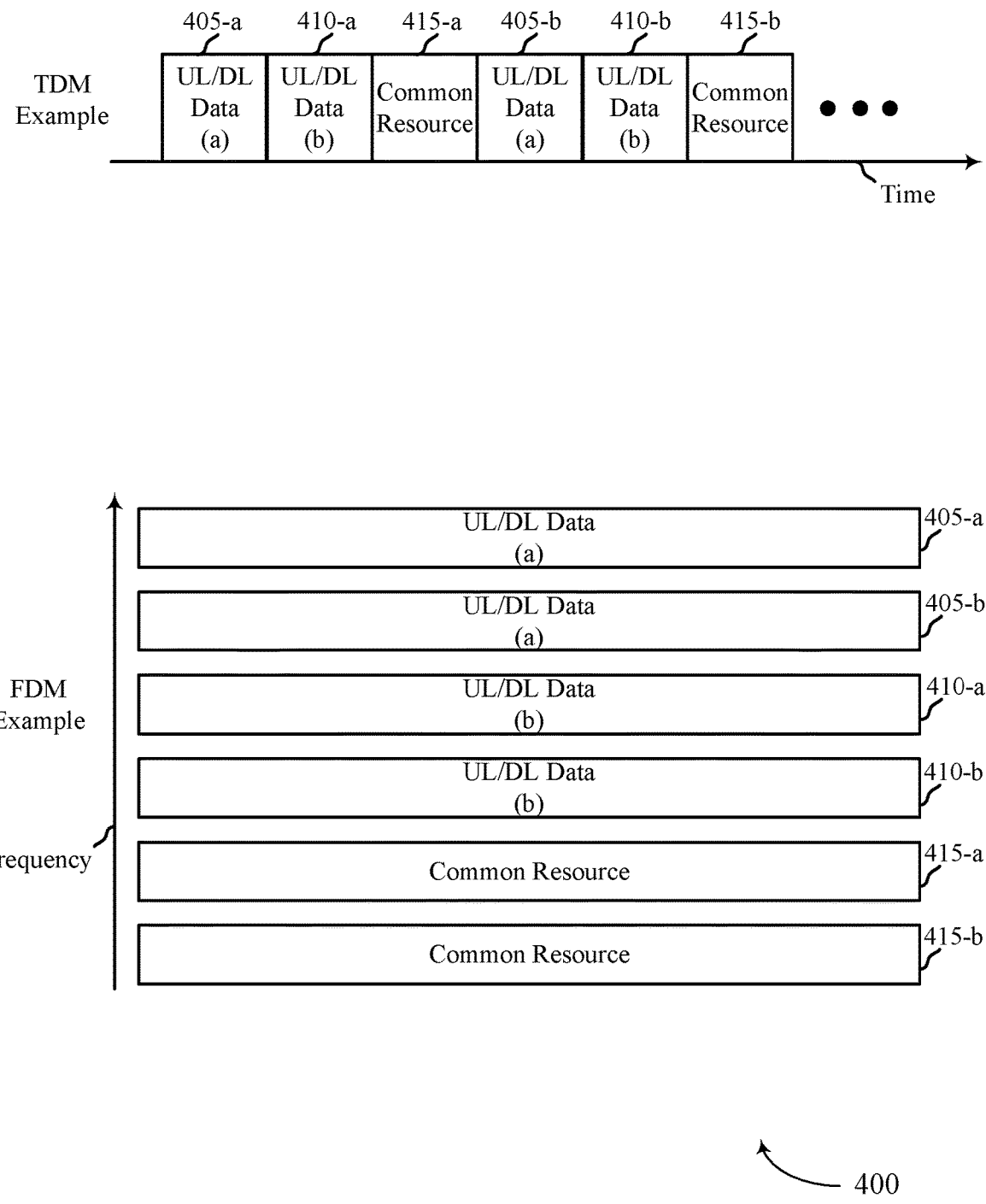
FIG. 4 illustrates an example of a resource configuration that supports resource partitioning in a wireless backhaul network in accordance with aspects of the present disclosure.

FIG. 4 illustrates an example of a resource configuration 400 that supports resource partitioning in a wireless backhaul network in accordance with various aspects of the present disclosure. In some examples, resource configuration 400 may implement aspects of wireless communications system 100 and/or backhaul networks 200/300.

Generally, resource configuration 400 illustrates two examples of resource configurations that may be used in accordance with aspects of the present description. A first example includes a TDM example where resources from the first and/or second set of resources available for access and/or backhaul communications are allocated to different time periods. For example, the TDM example may include a first subset of partitioned resources 405, a second subset of partitioned resources 410, and a set of common resources 415 that are used for access and/or backhaul communications. The resources 405, 410, and 415, however, are allocated such that only one set (or subset) of resources are being used at any particular time. For example, the first subset of partitioned resources 405 may be used by wireless node(s) of a backhaul network during a first time period, the second subset of partitioned resources 410 may be used by wireless node(s) of the backhaul network during a second time period, and the set of common resources 415 may be used by wireless node(s) of the backhaul network during a third time period. The first, second, and third time periods may not overlap.

A second example includes a FDM example where resources from the first and/or second set of resources available for access and/or backhaul communications are allocated to different frequencies, channels, subcarriers, carriers, and the like. For example, the FDM example may include the first subset of partitioned resources 405, the second subset of partitioned resources 410, and the set of common resources 415 that are used for access and/or backhaul communications. The resources 405, 410, and 415, however, are allocated such that only one set (or subset) of resources are being used on any particular frequency. For example, the first subset of partitioned resources 405 may be used by wireless node(s) of a backhaul network using a first set of channel(s) (e.g., the top two frequencies), the second subset of partitioned resources 410 may be used by wireless node(s) of the backhaul network using a second set of channel(s) (e.g., the middle two frequencies), and the set of common resources 415 may be used by wireless node(s) of the backhaul network using a third set of channel(s) (e.g., the bottom two frequencies). The first, second, and third set of channels may not overlap.

Although the resource configuration 400 illustrates a TDM and FDM example of a resource configuration, it is to be understood that the resources described in the present disclosure are not limited to time or frequency resources. Instead, the resources referenced in the present disclosure may include time, frequency, code, and/or space resources. For example, a space resource may include beamformed transmissions where transmissions beamformed in different directions may not overlap or otherwise interfere with each other. A backhaul network using mmW bands may benefit from such a SDM technique due to controlled beam widths, for example. Moreover, a CDM may also be used with the described techniques to separate the transmissions from the wireless nodes.

Figure 5:
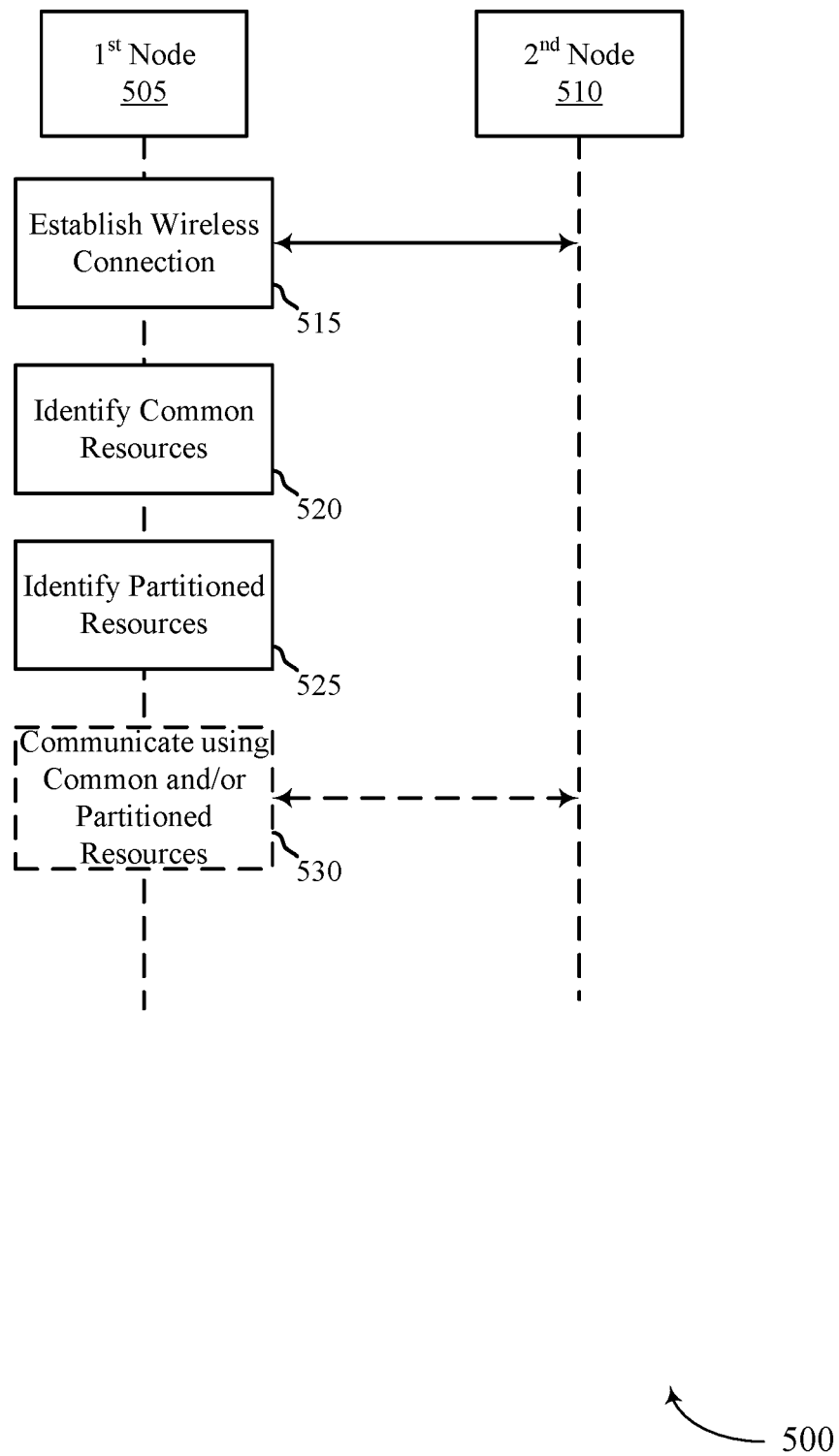
FIG. 5 illustrates an example of a process that supports resource partitioning in a wireless backhaul network in accordance with aspects of the present disclosure.

FIG. 5 illustrates an example of a process 500 that supports resource partitioning in a wireless backhaul network in accordance with various aspects of the present disclosure. In some examples, process 500 may implement aspects of wireless communications system 100, backhaul networks 200/300, and/or resource configuration 400. Process 500 may include a first node 505 and a second node 510, which may be examples of a wireless node of a wireless backhaul communication network. Thus, the first node 505 and/or second node 510 may be examples of a base station and/or UE, as is described herein.

At 515, the first node 505 may establish a wireless connection with the second node 510. The first node 505 and the second node 510 may be in a wireless backhaul communications network. The wireless backhaul communications network may be a mmW network.

At 520, the first node 505 may identify a first set of common resources for use in access and/or backhaul communications. The first set of common resources may be allocated for common use by the wireless nodes of the wireless backhaul communications network (e.g., first node 505 and second node 510).

In some aspects, first node 505 may identify the first set of common resources based on a message received from a central scheduler function of a core network and/or from neighboring wireless node(s) of the wireless backhaul communications network. Example messages include, but are not limited to, a minSI, a RMSI, a MIB, a SIB, a synchronization signal, a reference signal, an RRC message, or any combination of such signals/messages. In some aspects, first node 505 may also transmit a signal to neighboring wireless node(s) that identifies some or all of the first set of common resources.

At 525, the first node 505 may identify a second set of partitioned resources available for access and/or backhaul communications. The second set of partitioned resources may be partitioned into subsets of resources, each subset being allocated for use by a subset of wireless nodes of the wireless backhaul communications network.

In some aspects, first node 505 may identify the second set of partitioned resources based on a message received from a central scheduler function of a core network and/or from a neighboring wireless node(s) of the wireless backhaul communications network. Example messages include, but are not limited to, a minSI, a RMSI, a MIB, a SIB, a synchronization signal, a reference signal, an RRC message, or any combination of such signals/messages. In some aspects, first node 505 may also transmit a signal to neighboring wireless node(s) that identifies some or all of the second set of partitioned resources.

In some aspects, the first node 505 may identify the first set of common resources and the subset of resources of the second set of partitioned resources based on information stored by the first node 505. For example, first node 505 may be deterministically configured with information identify the sets of resources.

At 530, the first node 505 and second node 510 may optionally communicate using the sets of common and/or partitioned resources. That is, first node 505 may communicate with second node 510 using the first set of common resources and/or the second set of partitioned resources.

In some aspects, first node 505 may perform an access procedure with the second node 510 using the first set of common resources. The access procedure may include one or more of a synchronization procedure, a random access procedure, a system information procedure, a reference signal procedure, a paging procedure, a discovery messaging procedure, a radio resource management procedure, and/or a radio link management procedure. In some aspects, the paging procedure comprises communicating on at least one of a control channel (e.g., PDCCH) and/or a data channel (PDSCH). The synchronization procedure may include first node 505 communicating (e.g., Tx/Rx) synchronization signals or a synchronization channel using some or all of the first set of common resources for access communications and/or backhaul communications. The random access procedure may include first node 505 communicating (e.g., Tx/Rx) a RACH message 1, a RACH message 2, a RACH message 3, and/or a RACH message 4 using some or all of the first set of common resources for access communications and/or backhaul communications. The system information procedure may include first node 505 communicating (e.g., Tx/Rx) a MIB, a SIB, a RMSI, and/or a minSI using some or all of the first set of common resources for access communications and/or backhaul communications. The reference signal procedure may include first node 505 communicating (e.g., Tx/Rx) a beam reference signal like a CSI-RS, PRS, and/or a BRS using some or all of the first set of common resources for access communications and/or backhaul communications.

In some aspects, the first set of common resources and/or the second set of partitioned resources may include a TDM resource, a FDM resource, a CDM resource, and/or a SDM resource.

Figure 6:
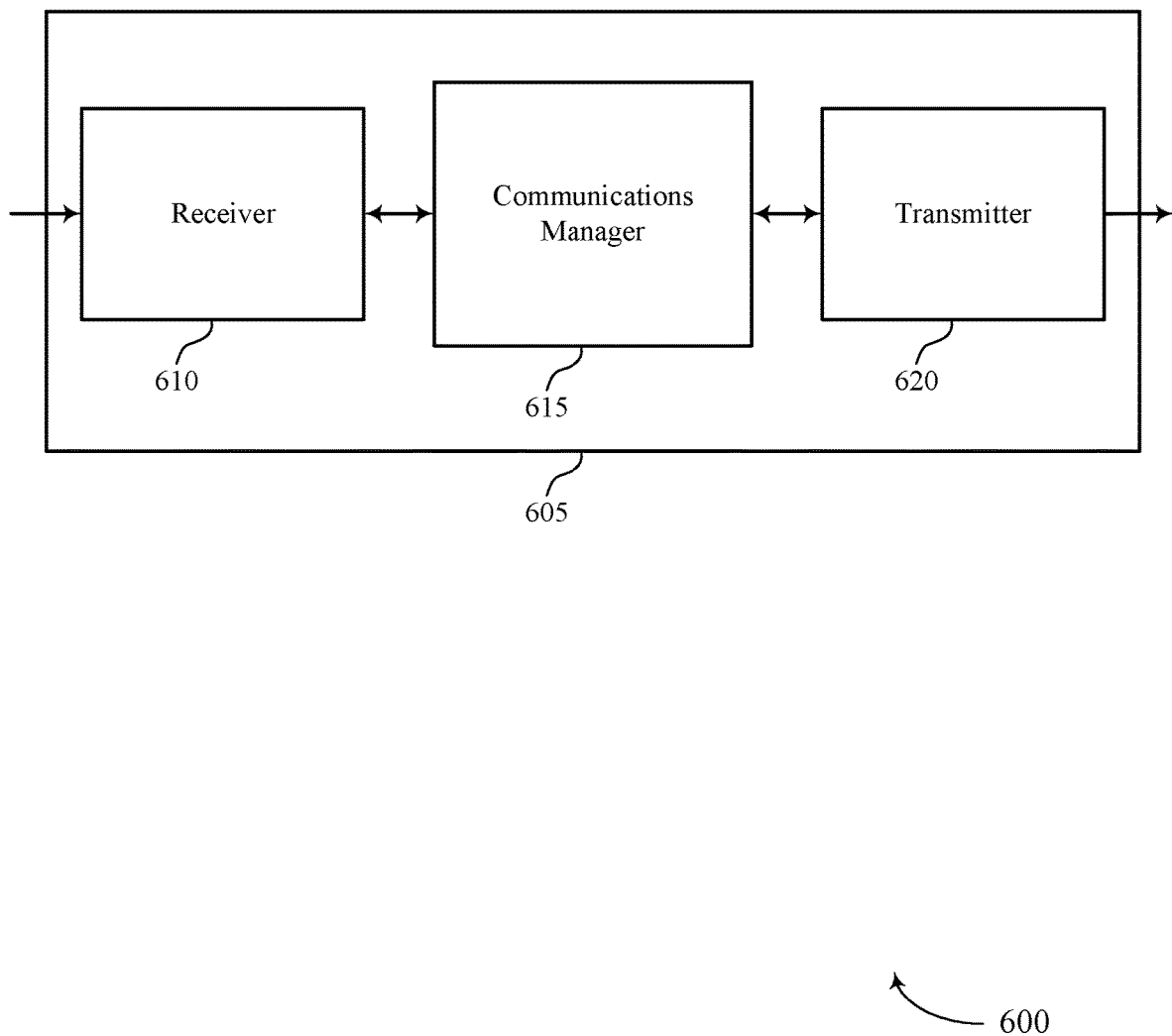
FIGS. 6 through 8 show block diagrams of a device that supports resource partitioning in a wireless backhaul network in accordance with aspects of the present disclosure.

FIG. 6 shows a block diagram 600 of a wireless device 605 that supports resource partitioning in a wireless backhaul network in accordance with aspects of the present disclosure. Wireless device 605 may be an example of aspects of a UE 115 or base station 105 as described herein. Wireless device 605 may include receiver 610, communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to resource partitioning in a wireless backhaul network, etc.). Information may be passed on to other components of the device. The receiver 610 may be an example of aspects of the transceiver 935 described with reference to FIG. 9. The receiver 610 may utilize a single antenna or a set of antennas.

Communications manager 615 may be an example of aspects of the communications manager 915 described with reference to FIG. 9.

Communications manager 615 and/or at least some of its various sub-components may be implemented in hardware, software executed by a processor, firmware, or any combination thereof. If implemented in software executed by a processor, the functions of the communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 615 and/or at least some of its various sub-components may be physically located at various positions, including being distributed such that portions of functions are implemented at different physical locations by one or more physical devices. In some examples, communications manager 615 and/or at least some of its various sub-components may be a separate and distinct component in accordance with various aspects of the present disclosure. In other examples, communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 615 may establish a wireless connection between a first wireless node and a second wireless node in a wireless backhaul communications network. Communications manager 615 may identify a first set of common resources for use in at least one of access communications or backhaul communications, where the first set of common resources is allocated for common use by the wireless nodes of the wireless backhaul communications network. Communications manager 615 may identify a second set of partitioned resources available for at least one of access communications or backhaul communications, the second set partitioned into a set of subsets each allocated for use by selected subsets of one or more of the wireless nodes of the wireless backhaul communications network.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
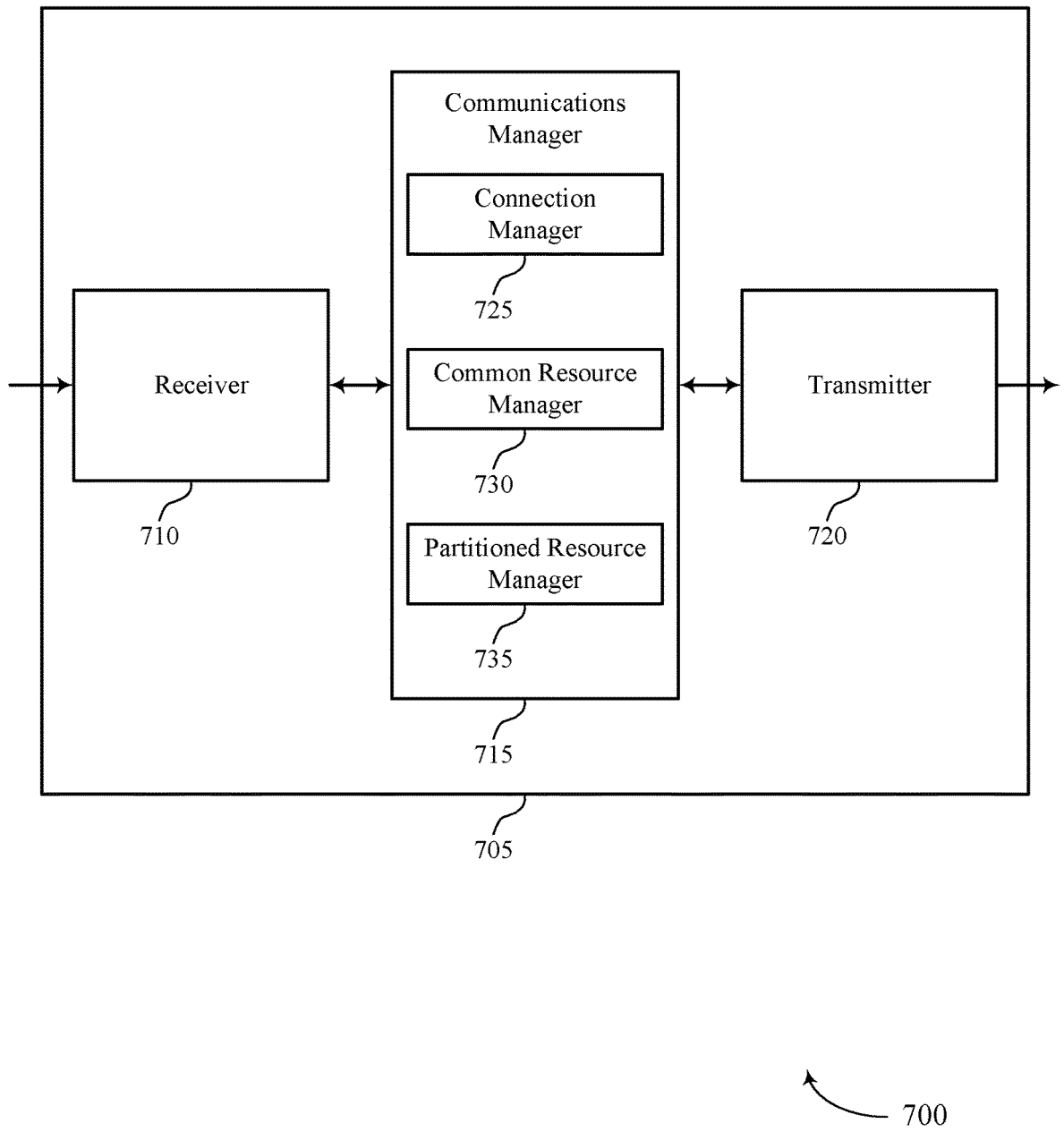

FIG. 7 shows a block diagram 700 of a wireless device 705 that supports resource partitioning in a wireless backhaul network in accordance with aspects of the present disclosure. Wireless device 705 may be an example of aspects of a wireless device 605 or a UE 115 or base station 105 as described herein. Wireless device 705 may include receiver 710, communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to resource partitioning in a wireless backhaul network, etc.). Information may be passed on to other components of the device. The receiver 710 may be an example of aspects of the transceiver 935 described with reference to FIG. 9. The receiver 710 may utilize a single antenna or a set of antennas.

Communications manager 715 may be an example of aspects of the communications manager 915 described with reference to FIG. 9. Communications manager 715 may also include connection manager 725, common resource manager 730, and partitioned resource manager 735.

Connection manager 725 may establish a wireless connection between a first wireless node and a second wireless node in a wireless backhaul communications network. Connection manager 725 may communicate with the second wireless node using the first set of common resources or the second set of partitioned resources. The first set of common resources and/or the second set of partitioned resources include a time division multiplexing resource, a frequency division multiplexing resource, a code division multiplexing resource, a space division multiplexing resource, or any combination thereof. In some cases, the wireless backhaul communications network includes a mmW wireless communication network.

Common resource manager 730 may identify a first set of common resources for use in at least one of access communications or backhaul communications, where the first set of common resources is allocated for common use by the wireless nodes of the wireless backhaul communications network.

Partitioned resource manager 735 may identify a second set of partitioned resources available for at least one of access communications or backhaul communications, the second set partitioned into a set of subsets each allocated for use by selected subsets of one or more of the wireless nodes of the wireless backhaul communications network.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
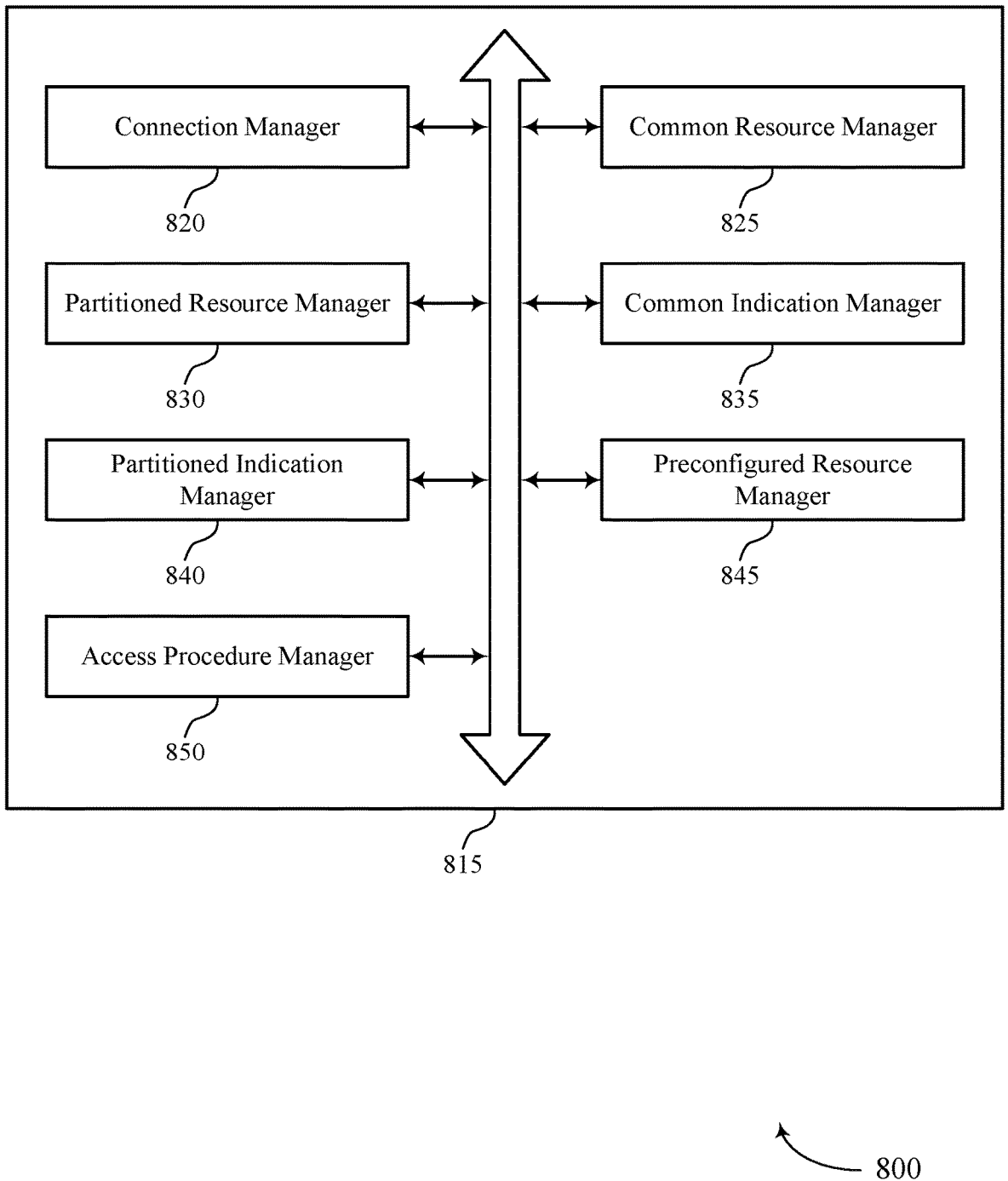

FIG. 8 shows a block diagram 800 of a communications manager 815 that supports resource partitioning in a wireless backhaul network in accordance with aspects of the present disclosure. The communications manager 815 may be an example of aspects of a communications manager 615, a communications manager 715, or a communications manager 915 described with reference to FIGS. 6, 7, and 9. The communications manager 815 may include connection manager 820, common resource manager 825, partitioned resource manager 830, common indication manager 835, partitioned indication manager 840, preconfigured resource manager 845, and access procedure manager 850. Each of these modules may communicate, directly or indirectly, with one another (e.g., via one or more buses).

Connection manager 820 may establish a wireless connection between a first wireless node and a second wireless node in a wireless backhaul communications network. Connection manager 820 may communicate with the second wireless node using the first set of common resources or the second set of partitioned resources. The first set of common resources and/or the second set of partitioned resources include a time division multiplexing resource, a frequency division multiplexing resource, a code division multiplexing resource, a space division multiplexing resource, or any combination thereof. In some cases, the wireless backhaul communications network includes a mmW wireless communication network.

Common resource manager 825 may identify a first set of common resources for use in at least one of access communications or backhaul communications, where the first set of common resources is allocated for common use by the wireless nodes of the wireless backhaul communications network.

Partitioned resource manager 830 may identify a second set of partitioned resources available for at least one of access communications or backhaul communications, the second set partitioned into a set of subsets each allocated for use by selected subsets of one or more of the wireless nodes of the wireless backhaul communications network.

Common indication manager 835 may receive a message, where identifying the first set of common resources is based on the received message. Common indication manager 835 may transmit a message to a neighboring wireless node identifying at least a portion of the first set of common resources. In some cases, the message is received from a central scheduler function of a core network. In some cases, the message is received from a neighboring wireless node of the wireless backhaul communications network. In some cases, the message identifying the first set of common resources includes a minSI message, a MIB message, a SIB message, an upper layer message, a synchronization signal, a reference signal, a RRC message, or any combination thereof.

Partitioned indication manager 840 may receive a message, where identifying the subset of resources of the second set of partitioned resources is based on the received message. Partitioned indication manager 840 may transmit a message to a neighboring wireless node identifying at least a portion of the subset of resources of the second set of partitioned resources. In some cases, the message is received from a central scheduler function of a core network. In some cases, the message is received from a neighboring wireless node of the wireless backhaul communications network. In some cases, the message identifying the subset of resources of the second set of partitioned resources includes a minSI message, a MIB message, a SIB message, an upper layer message, a synchronization signal, a reference signal, a RRC message, or any combination thereof.

Preconfigured resource manager 845 may identify the first set of common resources and the subset of resources of the second set of partitioned resources based on using information stored by the first wireless node.

Access procedure manager 850 may perform an access procedure with at least one other wireless node of the wireless backhaul communications network using the first set of common resources. In some cases, the access procedure includes at least one of: a synchronization procedure, a random access procedure, a system information procedure, a reference signal procedure, a paging procedure, a discovery messaging procedure, a radio resource management procedure, a radio link management procedure, or any combination thereof. In some aspects, the paging procedure comprises communicating on at least one of a control channel (e.g., PDCCH) and/or a data channel (PDSCH). In some cases, the synchronization procedure includes communicating synchronization signals or on a synchronization channel using at least a portion of the first set of common resources for access communications, backhaul communications, or combinations thereof. In some cases, the random access procedure includes communicating at least one of a RACH message 1, a RACH message 2, a RACH message 3, or a RACH message 4 using at least a portion of the first set of common resources for access communications, backhaul communications, or combinations thereof. In some cases, the system information procedure includes communicating at least one of a MIB, a SIB, a RMSI, or a minSI using at least a portion of the first set of common resources for access communications, backhaul communications, or combinations thereof. In some cases, the reference signal procedure includes communicating at least one of a beam or channel reference signal like a CSI-RS, PRS, or a BRS using at least a portion of the first set of common resources for access communications, backhaul communications, or combinations thereof.

Figure 9:
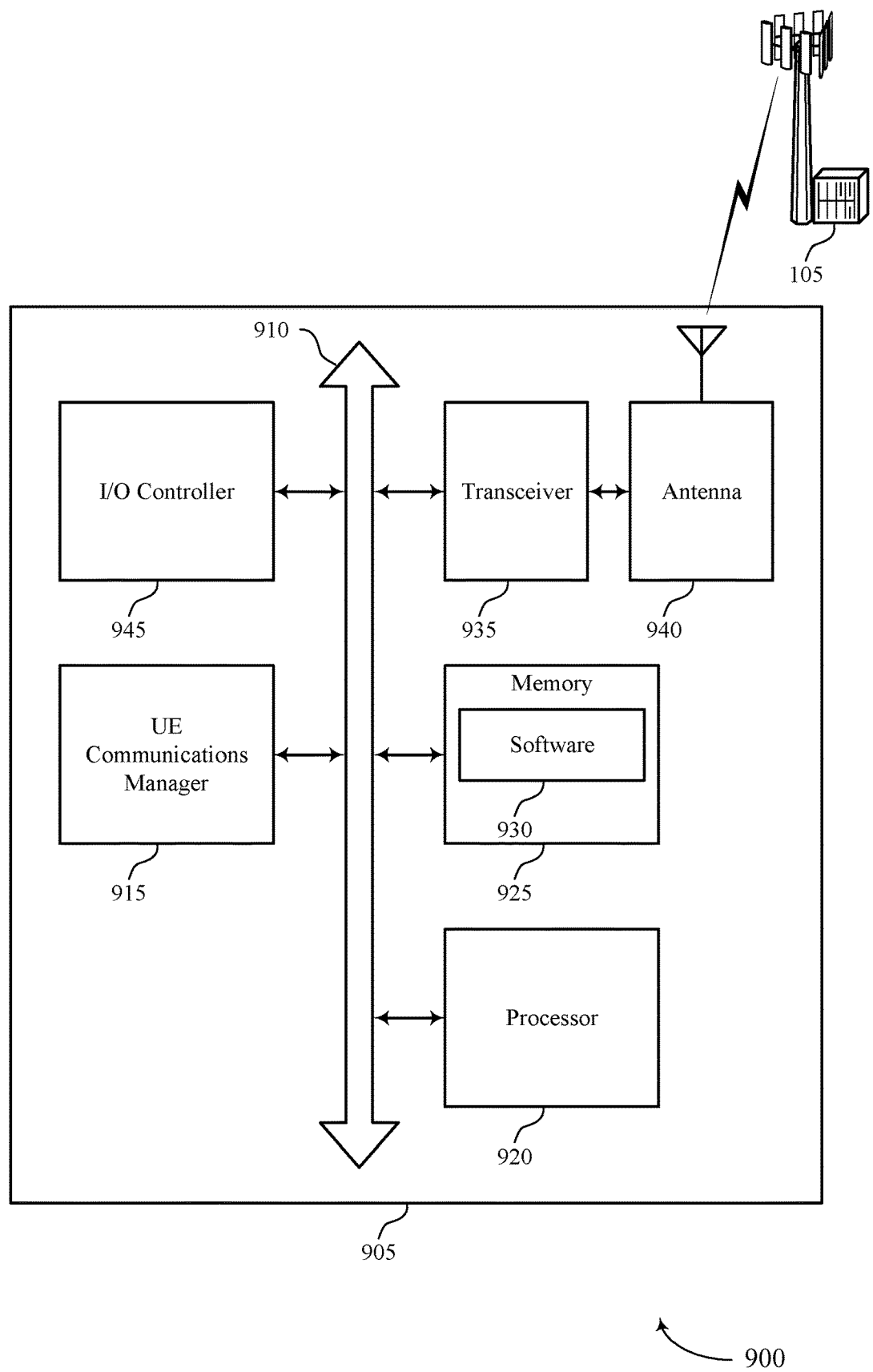
FIG. 9 illustrates a block diagram of a system including a UE that supports resource partitioning in a wireless backhaul network in accordance with aspects of the present disclosure.

FIG. 9 shows a diagram of a system 900 including a device 905 that supports resource partitioning in a wireless backhaul network in accordance with aspects of the present disclosure. Device 905 may be an example of or include the components of wireless device 605, wireless device 705, or a UE 115 as described herein. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting resource partitioning in a wireless backhaul network).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support resource partitioning in a wireless backhaul network. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
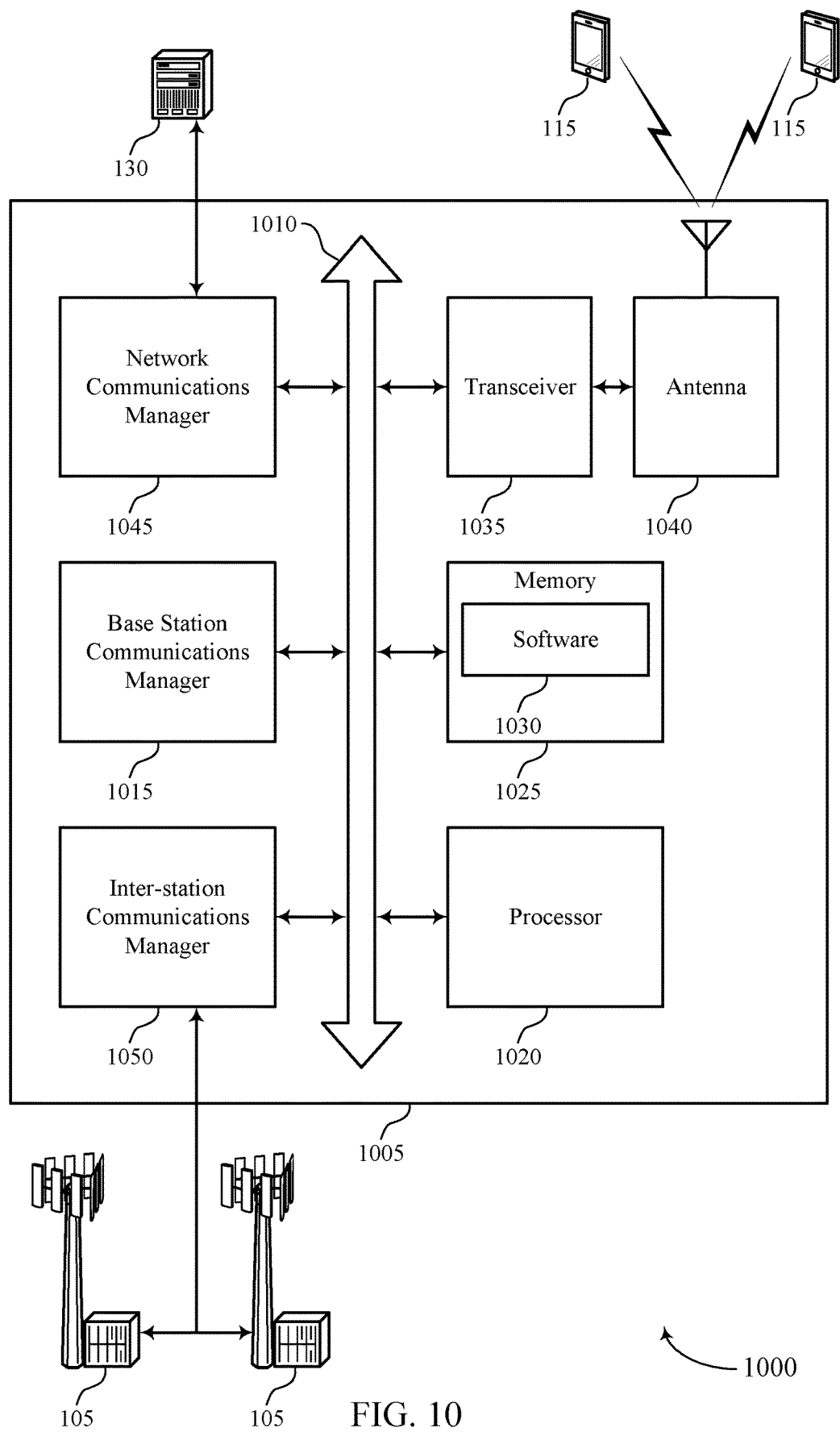
FIG. 10 illustrates a block diagram of a system including a base station that supports resource partitioning in a wireless backhaul network in accordance with aspects of the present disclosure.

FIG. 10 shows a diagram of a system 1000 including a device 1005 that supports resource partitioning in a wireless backhaul network in accordance with aspects of the present disclosure. Device 1005 may be an example of or include the components of wireless device 705, wireless device 805, or a base station 105 as described herein. Device 1005 may include components for bi-directional voice and data communications including components for transmitting and receiving communications, including base station communications manager 1015, processor 1020, memory 1025, software 1030, transceiver 1035, antenna 1040, network communications manager 1045, and inter-station communications manager 1050. These components may be in electronic communication via one or more buses (e.g., bus 1010). Device 1005 may communicate wirelessly with one or more UEs 115.

Processor 1020 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting resource partitioning in a wireless backhaul network).

Memory 1025 may include RAM and ROM. The memory 1025 may store computer-readable, computer-executable software 1030 including instructions that, when executed, cause the processor to perform various functions described herein. In some cases, the memory 1025 may contain, among other things, a BIOS which may control basic hardware or software operation such as the interaction with peripheral components or devices.

Software 1030 may include code to implement aspects of the present disclosure, including code to support resource partitioning in a wireless backhaul network. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Inter-station communications manager 1050 may manage communications with other base station 105, and may include a controller or scheduler for controlling communications with UEs 115 in cooperation with other base stations 105. For example, the inter-station communications manager 1050 may coordinate scheduling for transmissions to UEs 115 for various interference mitigation techniques such as beamforming or joint transmission. In some examples, inter-station communications manager 1050 may provide an X2 interface within an LTE/LTE-A wireless communication network technology to provide communication between base stations 105.

Figure 11:
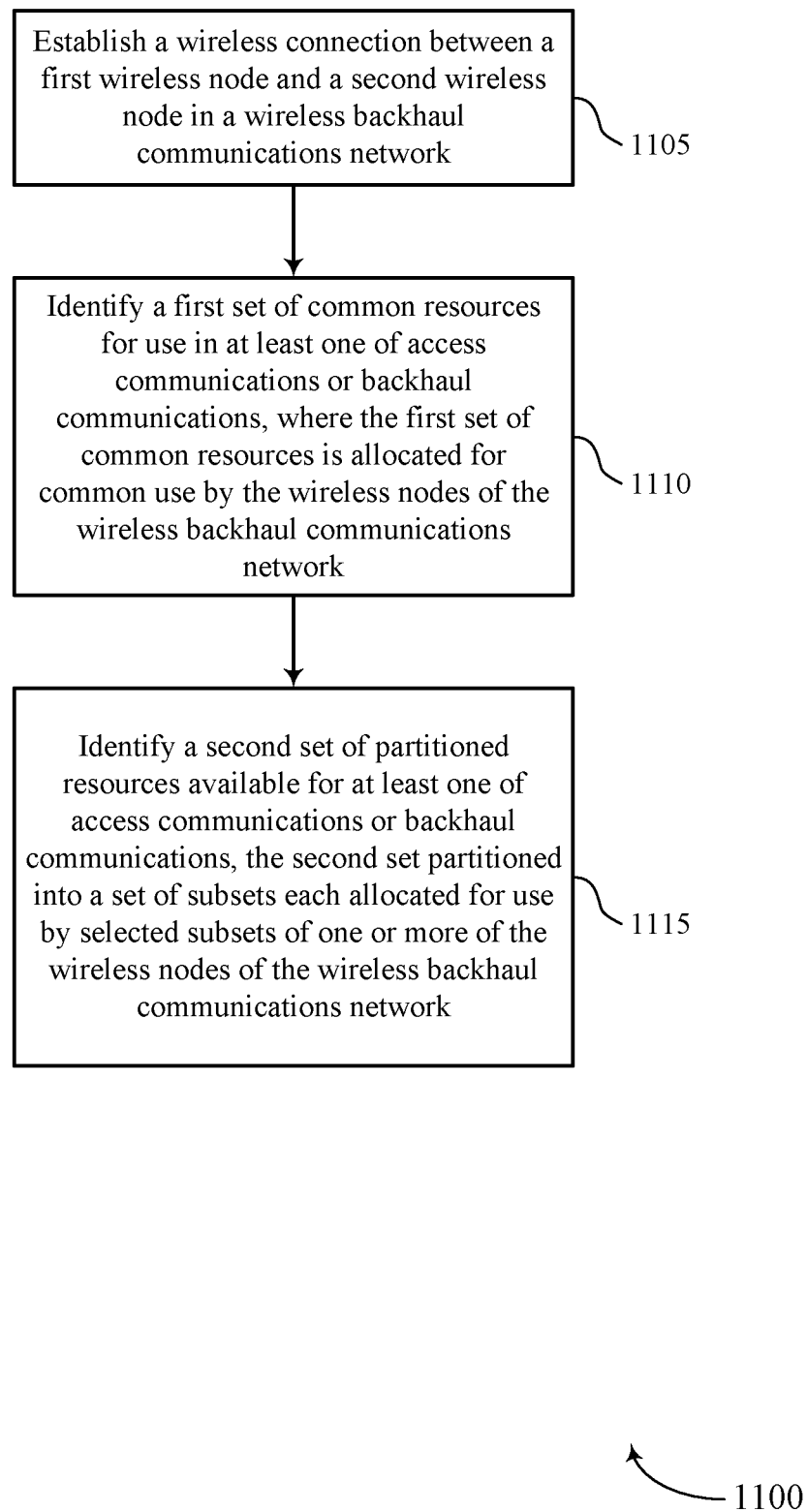
FIGS. 11 through 13 illustrate methods for resource partitioning in a wireless backhaul network in accordance with aspects of the present disclosure.

FIG. 11 shows a flowchart illustrating a method 1100 for resource partitioning in a wireless backhaul network in accordance with aspects of the present disclosure. The operations of method 1100 may be implemented by a UE 115 or base station 105 or its components as described herein. For example, the operations of method 1100 may be performed by a communications manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1105 the UE 115 or base station 105 may establish a wireless connection between a first wireless node and a second wireless node in a wireless backhaul communications network. The operations of block 1105 may be performed according to the methods described herein. In certain examples, aspects of the operations of block 1105 may be performed by a connection manager as described with reference to FIGS. 6 through 8.

At block 1110 the UE 115 or base station 105 may identify a first set of common resources for use in at least one of access communications or backhaul communications, wherein the first set of common resources is allocated for common use by the wireless nodes of the wireless backhaul communications network. The operations of block 1110 may be performed according to the methods described herein. In certain examples, aspects of the operations of block 1110 may be performed by a common resource manager as described with reference to FIGS. 6 through 8.

At block 1115 the UE 115 or base station 105 may identify a second set of partitioned resources available for at least one of access communications or backhaul communications, the second set partitioned into a plurality of subsets each allocated for use by selected subsets of one or more of the wireless nodes of the wireless backhaul communications network. The operations of block 1115 may be performed according to the methods described herein. In certain examples, aspects of the operations of block 1115 may be performed by a partitioned resource manager as described with reference to FIGS. 6 through 8.

Figure 12:
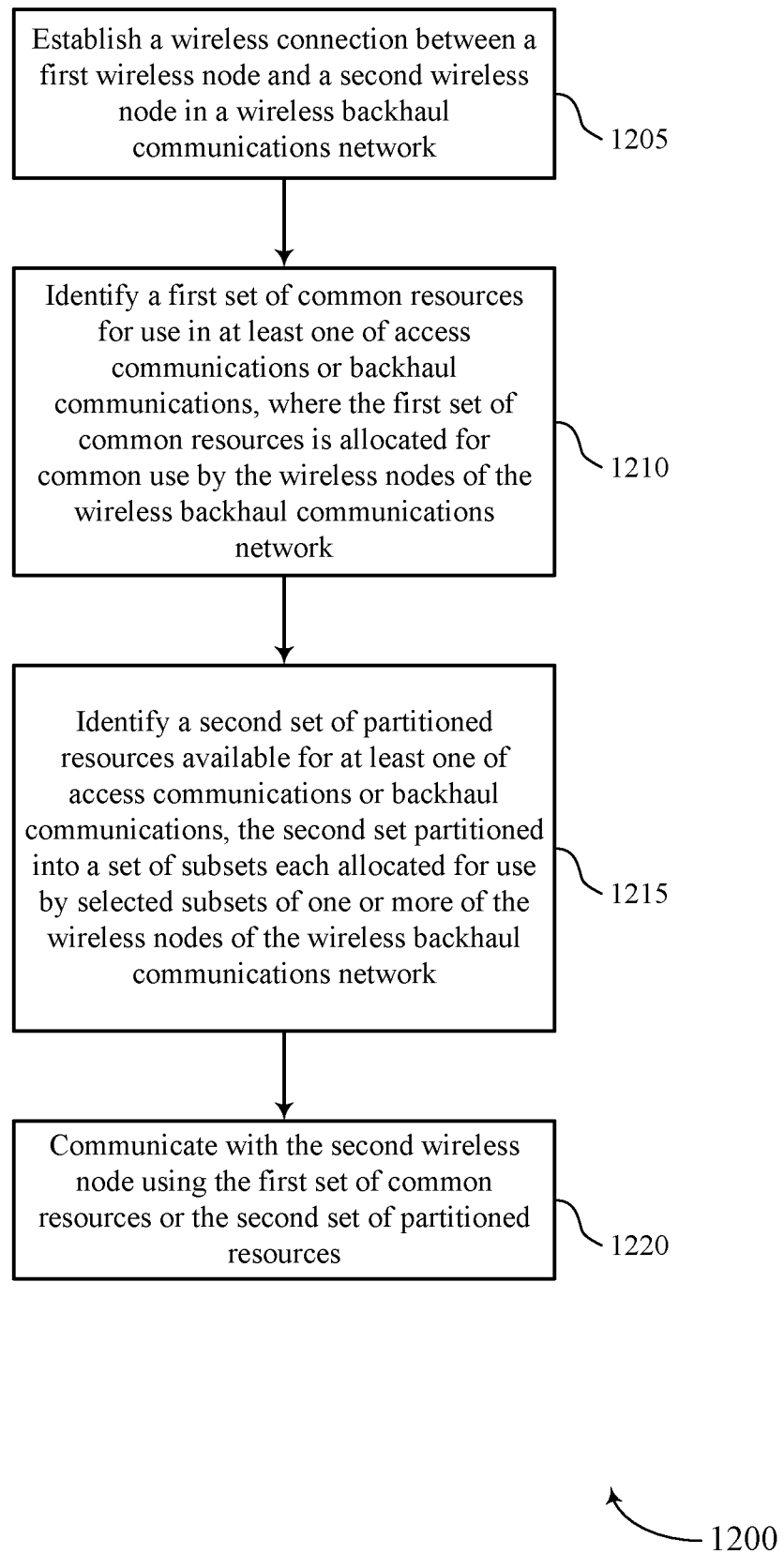

FIG. 12 shows a flowchart illustrating a method 1200 for resource partitioning in a wireless backhaul network in accordance with aspects of the present disclosure. The operations of method 1200 may be implemented by a UE 115 or base station 105 or its components as described herein. For example, the operations of method 1200 may be performed by a communications manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1205 the UE 115 or base station 105 may establish a wireless connection between a first wireless node and a second wireless node in a wireless backhaul communications network. The operations of block 1205 may be performed according to the methods described herein. In certain examples, aspects of the operations of block 1205 may be performed by a connection manager as described with reference to FIGS. 6 through 8.

At block 1210 the UE 115 or base station 105 may identify a first set of common resources for use in at least one of access communications or backhaul communications, wherein the first set of common resources is allocated for common use by the wireless nodes of the wireless backhaul communications network. The operations of block 1210 may be performed according to the methods described herein. In certain examples, aspects of the operations of block 1210 may be performed by a common resource manager as described with reference to FIGS. 6 through 8.

At block 1215 the UE 115 or base station 105 may identify a second set of partitioned resources available for at least one of access communications or backhaul communications, the second set partitioned into a plurality of subsets each allocated for use by selected subsets of one or more of the wireless nodes of the wireless backhaul communications network. The operations of block 1215 may be performed according to the methods described herein. In certain examples, aspects of the operations of block 1215 may be performed by a partitioned resource manager as described with reference to FIGS. 6 through 8.

At block 1220 the UE 115 or base station 105 may communicate with the second wireless node using the first set of common resources or the second set of partitioned resources. The operations of block 1220 may be performed according to the methods described herein. In certain examples, aspects of the operations of block 1220 may be performed by a connection manager as described with reference to FIGS. 6 through 8.

Figure 13:
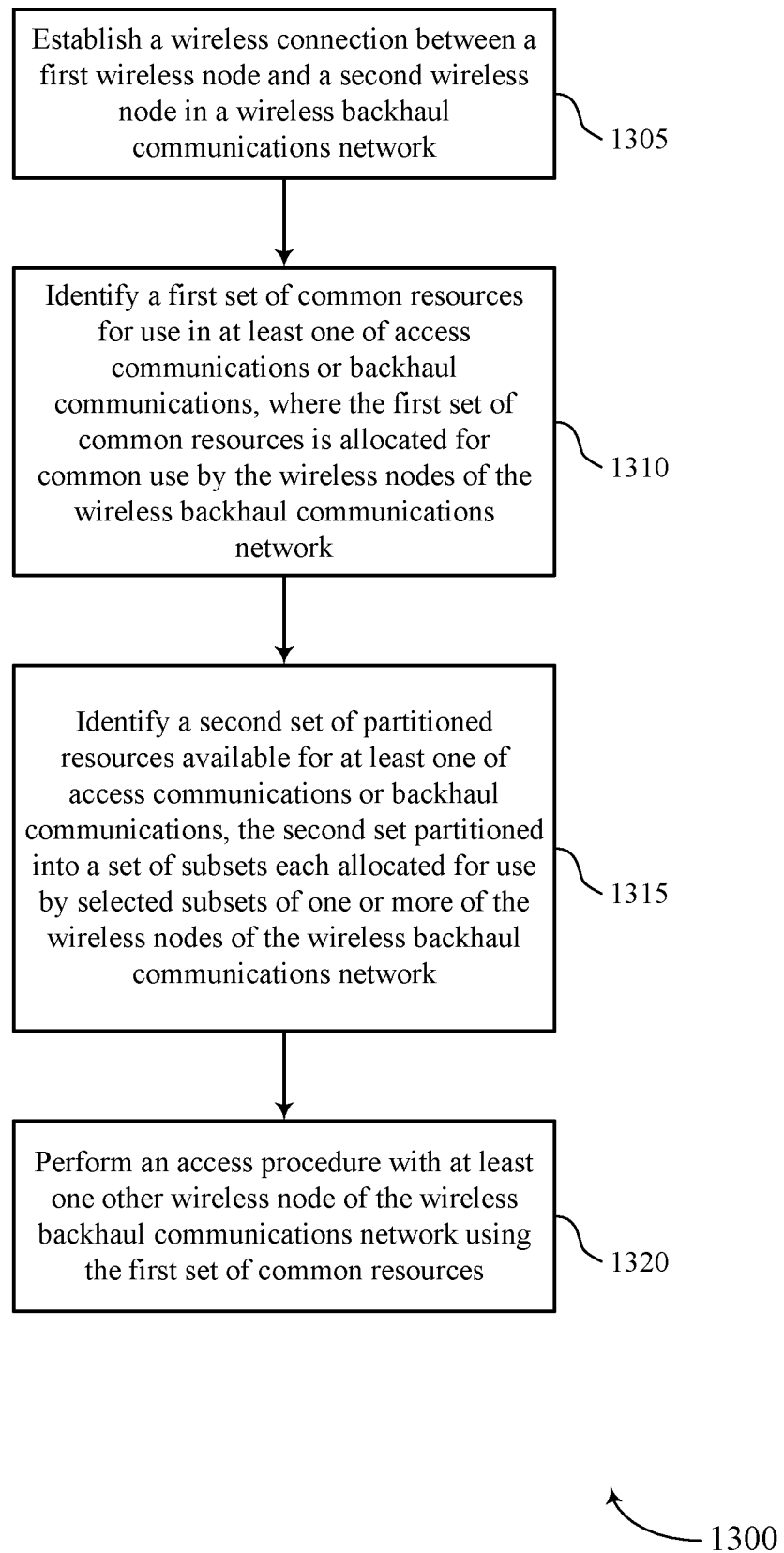

FIG. 13 shows a flowchart illustrating a method 1300 for resource partitioning in a wireless backhaul network in accordance with aspects of the present disclosure. The operations of method 1300 may be implemented by a UE 115 or base station 105 or its components as described herein. For example, the operations of method 1300 may be performed by a communications manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1305 the UE 115 or base station 105 may establish a wireless connection between a first wireless node and a second wireless node in a wireless backhaul communications network. The operations of block 1305 may be performed according to the methods described herein. In certain examples, aspects of the operations of block 1305 may be performed by a connection manager as described with reference to FIGS. 6 through 8.

At block 1310 the UE 115 or base station 105 may identify a first set of common resources for use in at least one of access communications or backhaul communications, wherein the first set of common resources is allocated for common use by the wireless nodes of the wireless backhaul communications network. The operations of block 1310 may be performed according to the methods described herein. In certain examples, aspects of the operations of block 1310 may be performed by a common resource manager as described with reference to FIGS. 6 through 8.

At block 1315 the UE 115 or base station 105 may identify a second set of partitioned resources available for at least one of access communications or backhaul communications, the second set partitioned into a plurality of subsets each allocated for use by selected subsets of one or more of the wireless nodes of the wireless backhaul communications network. The operations of block 1315 may be performed according to the methods described herein. In certain examples, aspects of the operations of block 1315 may be performed by a partitioned resource manager as described with reference to FIGS. 6 through 8.

At block 1320 the UE 115 or base station 105 may perform an access procedure with at least one other wireless node of the wireless backhaul communications network using the first set of common resources. The operations of block 1320 may be performed according to the methods described herein. In certain examples, aspects of the operations of block 1320 may be performed by a access procedure manager as described with reference to FIGS. 6 through 8.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   establishing a wireless connection between a first wireless node and a second wireless node in a wireless backhaul communications network;
   identifying a first set of common resources for use in access communications and backhaul communications, wherein the first set of common resources is allocated for common use by the wireless nodes of the wireless backhaul communications network; and
   identifying a second set of partitioned resources available for use in access communications and backhaul communications, the second set partitioned into a plurality of subsets each allocated for use by selected subsets of one or more of the wireless nodes of the wireless backhaul communications network.

2. The method of claim 1, further comprising:
   communicating with the second wireless node using the first set of common resources or the second set of partitioned resources.

3. The method of claim 1, further comprising:
   receiving a message, wherein identifying the first set of common resources is based at least in part on the received message.

4. The method of claim 3, wherein the message is received from a central scheduler function of a core network.

5. The method of claim 3, wherein the message is received from a neighboring wireless node of the wireless backhaul communications network.

6. The method of claim 3, wherein the message identifying the first set of common resources comprises a minimum system information (minSI) message, a master information block (MIB) message, a system information block (SIB) message, an upper layer message, a synchronization signal, a reference signal, a radio resource control (RRC) message, or any combination thereof.

7. The method of claim 1, further comprising:
transmitting a message to a neighboring wireless node identifying at least a portion of the first set of common resources.

8. The method of claim 1, further comprising:
receiving a message, wherein identifying the subset of resources of the second set of partitioned resources is based at least in part on the received message.

9. The method of claim 8, wherein the message is received from a central scheduler function of a core network.

10. The method of claim 8, wherein the message is received from a neighboring wireless node of the wireless backhaul communications network.

11. The method of claim 8, wherein the message identifying the subset of resources of the second set of partitioned resources comprises a minimum system information (minSI) message, an upper layer message, a master information block (MIB) message, a system information block (SIB) message, a synchronization signal, a reference signal, a radio resource control (RRC) message, or any combination thereof.

12. The method of claim 1, further comprising:
transmitting a message to a neighboring wireless node identifying at least a portion of the subset of resources of the second set of partitioned resources.

13. The method of claim 1, further comprising:
identifying the first set of common resources and the subset of resources of the second set of partitioned resources based at least in part on using information stored by the first wireless node.

14. The method of claim 1, further comprising:
performing an access procedure with at least one other wireless node of the wireless backhaul communications network using the first set of common resources.

15. The method of claim 14, wherein the access procedure comprises at least one of: a synchronization procedure, a random access procedure, a system information procedure, a reference signal procedure, a paging procedure, a discovery messaging procedure, a radio resource management procedure, a radio link management procedure, or any combination thereof.

16. The method of claim 15, wherein the synchronization procedure comprises communicating synchronization signals or on a synchronization channel using at least a portion of the first set of common resources for access communications, backhaul communications, or combinations thereof.

17. The method of claim 15, wherein the random access procedure comprises communicating at least one of a random access channel (RACH) message 1, a RACH message 2, a RACH message 3, or a RACH message 4 using at least a portion of the first set of common resources for access communications, backhaul communications, or combinations thereof.

18. The method of claim 15, wherein the system information procedure comprises communicating at least one of a master information block (MIB), a system information block (SIB), a remaining minimum system information (RMSI), or a minimum system information (minSI) using at least a portion of the first set of common resources for access communications, backhaul communications, or combinations thereof.

19. The method of claim 15, wherein the reference signal procedure comprises communicating at least one of a channel state information reference signal (CSI-RS), or a positioning reference signal, or a beamform reference signal (BRS) using at least a portion of the first set of common resources for access communications, backhaul communications, or combinations thereof.

20. The method of claim 15, wherein the paging procedure comprises communicating on at least one of a control channel, or a data channel, or a combination thereof.

21. The method of claim 1, wherein the wireless backhaul communications network comprises a millimeter wave (mmW) wireless communication network.

22. The method of claim 1, wherein:
either the first set of common resources or the second set of partitioned resources comprise a time division multiplexing resource, a frequency division multiplexing resource, a code division multiplexing resource, a space division multiplexing resource, or any combination thereof.

23. The method of claim 1, further comprising:
transmitting a signal indicating that a subset of the first set of common resources are repurposed for use in a local communications.

24. The method of claim 1, further comprising:
transmitting a first signal indicating a repurpose request for a subset of the first set of common resources for use in local communications;
receiving a second signal from at least one of the wireless nodes indicating a repurpose approval for the subset of the first set of common resources; and
using the subset of the first set of common resources based at least in part on the second signal.

25. An apparatus for wireless communication, comprising:
a processor,
memory in electronic communication with the processor; and
instructions stored in the memory and executable by the processor to cause the apparatus to:
establish a wireless connection between a first wireless node and a second wireless node in a wireless backhaul communications network;
identify a first set of common resources for use in access communications and backhaul communications, wherein the first set of common resources is allocated for common use by the wireless nodes of the wireless backhaul communications network; and
identify a second set of partitioned resources available for use in access communications and backhaul communications, the second set partitioned into a plurality of subsets each allocated for use by selected subsets of one or more of the wireless nodes of the wireless backhaul communications network.

26. The apparatus of claim 25, wherein the instructions are further executable by the processor to cause the apparatus to:
communicate with the second wireless node using the first set of common resources or the second set of partitioned resources.

27. The apparatus of claim 25, wherein the instructions are further executable by the processor to cause the apparatus to:
receive a message, wherein identifying the first set of common resources is based at least in part on the received message.

28. The apparatus of claim 27, wherein the message is received from a central scheduler function of a core network.

29. The apparatus of claim 27, wherein the message is received from a neighboring wireless node of the wireless backhaul communications network.

30. The apparatus of claim 27, wherein the message identifying the first set of common resources comprises a minimum system information (minSI) message, a master information block (MIB) message, a system information block (SIB) message, an upper layer message, a synchronization signal, a reference signal, a radio resource control (RRC) message, or any combination thereof.

31. The apparatus of claim 25, wherein the instructions are further executable by the processor to cause the apparatus to:
transmit a message to a neighboring wireless node identifying at least a portion of the first set of common resources.

32. The apparatus of claim 25, wherein the instructions are further executable by the processor to cause the apparatus to:
receive a message, wherein identifying the subset of resources of the second set of partitioned resources is based at least in part on the received message.

33. The apparatus of claim 32, wherein the message is received from a central scheduler function of a core network.

34. The apparatus of claim 32, wherein the message is received from a neighboring wireless node of the wireless backhaul communications network.

35. The apparatus of claim 32, wherein the message identifying the subset of resources of the second set of partitioned resources comprises a minimum system information (minSI) message, an upper layer message, a master information block (MIB) message, a system information block (SIB) message, a synchronization signal, a reference signal, a radio resource control (RRC) message, or any combination thereof.

36. The apparatus of claim 25, wherein the instructions are further executable by the processor to cause the apparatus to:
transmit a message to a neighboring wireless node identifying at least a portion of the subset of resources of the second set of partitioned resources.

37. The apparatus of claim 25, wherein the instructions are further executable by the processor to cause the apparatus to:
identify the first set of common resources and the subset of resources of the second set of partitioned resources based at least in part on using information stored by the first wireless node.

38. The apparatus of claim 25, wherein the instructions are further executable by the processor to cause the apparatus to:
perform an access procedure with at least one other wireless node of the wireless backhaul communications network using the first set of common resources.

39. An apparatus for wireless communication, comprising:
means for establishing a wireless connection between a first wireless node and a second wireless node in a wireless backhaul communications network;
means for identifying a first set of common resources for use in access communications and backhaul communications, wherein the first set of common resources is allocated for common use by the wireless nodes of the wireless backhaul communications network; and
means for identifying a second set of partitioned resources available for use in access communications and backhaul communications, the second set partitioned into a plurality of subsets each allocated for use by selected subsets of one or more of the wireless nodes of the wireless backhaul communications network.

40. A non-transitory computer-readable medium storing code for wireless communication, the code comprising instructions executable by a processor to:
establish a wireless connection between a first wireless node and a second wireless node in a wireless backhaul communications network;
identify a first set of common resources for use in access communications and backhaul communications, wherein the first set of common resources is allocated for common use by the wireless nodes of the wireless backhaul communications network; and
identify a second set of partitioned resources available for use in access communications and backhaul communications, the second set partitioned into a plurality of subsets each allocated for use by selected subsets of one or more of the wireless nodes of the wireless backhaul communications network.

* * * * *